(12) United States Patent
Gudem et al.

(10) Patent No.: US 9,362,958 B2
(45) Date of Patent: Jun. 7, 2016

(54) SINGLE CHIP SIGNAL SPLITTING CARRIER AGGREGATION RECEIVER ARCHITECTURE

(75) Inventors: Prasad Srinivasa Siva Gudem, San Diego, CA (US); Gurkanwal Singh Sahota, San Diego, CA (US); Li-chung Chang, Irvine, CA (US); Christian Holenstein, La Mesa, CA (US); Frederic Bossu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 245 days.

(21) Appl. No.: 13/411,444

(22) Filed: Mar. 2, 2012

(65) Prior Publication Data

US 2013/0231064 A1 Sep. 5, 2013

(51) Int. Cl.
*H04B 1/00* (2006.01)
*H04B 7/04* (2006.01)

(52) U.S. Cl.
CPC ............... *H04B 1/0057* (2013.01); *H04B 7/04* (2013.01)

(58) Field of Classification Search
CPC .................................. H04B 1/30; H03B 19/14
USPC ............... 455/73, 168.1, 178.1, 180.1, 188.1, 455/552.1, 243.1, 311; 375/219
See application file for complete search history.

(56) References Cited

U.S. PATENT DOCUMENTS

| | | | |
|---|---|---|---|
| 3,911,364 A | 10/1975 | Langseth et al. | |
| 4,035,728 A | 7/1977 | Ishikawa et al. | |
| 4,035,729 A | 7/1977 | Perry | |
| 4,246,655 A | 1/1981 | Parker | |
| 4,326,294 A | 4/1982 | Okamoto et al. | |
| 4,715,048 A | 12/1987 | Masamura | |
| 4,742,563 A | 5/1988 | Fukumura | |
| 4,756,023 A | 7/1988 | Kojima | |
| 4,969,207 A | 11/1990 | Sakamoto et al. | |
| 5,056,411 A | 10/1991 | Baker | |
| 5,128,630 A | 7/1992 | Mijuskovic | |

(Continued)

FOREIGN PATENT DOCUMENTS

| | | |
|---|---|---|
| CN | 1523912 A | 8/2004 |
| CN | 1922795 A | 2/2007 |

(Continued)

OTHER PUBLICATIONS

Aparin et al., "A Highly-integrated tri-band/quad-mode SiGe BiCMOS RF-to-baseband and receiver for wireless CDMA/WCDMA/AMPS applications with GPS capability", Solid-State Circuits Conference, 2002. Digest of Technical Papers. 2002 IEEE International Feb. 3-7, 2002, Piscataway, NJ, USA, IEEE, vol. 1, 2002, pp. 234-235, XP010585547, ISBN: 0-7803-7335-9.

(Continued)

*Primary Examiner* — Ping Hsieh
*Assistant Examiner* — Xin Jia
(74) *Attorney, Agent, or Firm* — James Gutierrez

(57) ABSTRACT

A wireless communication device configured for receiving a multiple carrier signal is described. The wireless communication device includes a single-chip signal splitting carrier aggregation receiver architecture. The single-chip signal splitting carrier aggregation receiver architecture includes a primary antenna, a secondary antenna and a transceiver chip. The single-chip signal splitting carrier aggregation receiver architecture reuses a simultaneous hybrid dual receiver path.

30 Claims, 10 Drawing Sheets

(56) References Cited

U.S. PATENT DOCUMENTS

| | | | |
|---|---|---|---|
| 5,291,519 A | 3/1994 | Tsurumaru | |
| 5,321,850 A | 6/1994 | Backstrom et al. | |
| 5,345,601 A | 9/1994 | Takagi et al. | |
| 5,390,342 A | 2/1995 | Takayama et al. | |
| 5,559,838 A | 9/1996 | Nakagoshi | |
| 5,566,364 A | 10/1996 | Mizoguchi et al. | |
| 5,694,396 A | 12/1997 | Firouzbakht et al. | |
| 5,697,083 A | 12/1997 | Sano | |
| 5,761,613 A | 6/1998 | Saunders et al. | |
| 5,794,159 A | 8/1998 | Portin | |
| 5,805,643 A | 9/1998 | Seki et al. | |
| 5,805,989 A | 9/1998 | Ushida | |
| 5,835,853 A | 11/1998 | Enoki et al. | |
| 5,940,452 A | 8/1999 | Rich | |
| 5,999,815 A | 12/1999 | Tenbrook et al. | |
| 5,999,990 A | 12/1999 | Sharrit et al. | |
| 6,026,288 A | 2/2000 | Bronner | |
| 6,040,732 A | 3/2000 | Brokaw | |
| 6,044,254 A | 3/2000 | Ohta et al. | |
| 6,063,961 A | 5/2000 | Kroner | |
| 6,069,923 A | 5/2000 | Ostman et al. | |
| 6,088,348 A | 7/2000 | Bell, III et al. | |
| 6,208,844 B1 | 3/2001 | Abdelgany | |
| 6,249,687 B1 | 6/2001 | Thomsen et al. | |
| 6,407,689 B1 | 6/2002 | Bazarjani et al. | |
| 6,424,683 B1 | 7/2002 | Schoellhorn | |
| 6,430,237 B1 | 8/2002 | Anvari | |
| 6,472,947 B1 | 10/2002 | Zeitz | |
| 6,473,601 B1 | 10/2002 | Oda | |
| 6,522,895 B1 | 2/2003 | Montalvo | |
| 6,535,725 B2 | 3/2003 | Hatcher et al. | |
| 6,600,759 B1 | 7/2003 | Wood | |
| 6,600,907 B1 | 7/2003 | Taguchi | |
| 6,600,931 B2 | 7/2003 | Sutton et al. | |
| 6,657,498 B2 | 12/2003 | Park et al. | |
| 6,806,777 B2 | 10/2004 | Franca-Neto | |
| 6,819,941 B2 | 11/2004 | Dening et al. | |
| 6,888,888 B1 | 5/2005 | Tu et al. | |
| 6,952,594 B2 | 10/2005 | Hendin | |
| 6,954,446 B2 | 10/2005 | Kuffner | |
| 6,983,132 B2 | 1/2006 | Woo et al. | |
| 6,985,712 B2 | 1/2006 | Yamakawa et al. | |
| 6,987,950 B2 | 1/2006 | Coan | |
| 7,013,166 B2 | 3/2006 | Clifford | |
| 7,023,272 B2 | 4/2006 | Hung et al. | |
| 7,024,172 B1 | 4/2006 | Murphy et al. | |
| 7,039,377 B2 | 5/2006 | Yates | |
| 7,123,891 B2 | 10/2006 | Loke | |
| 7,142,042 B1 | 11/2006 | Henry | |
| 7,161,423 B2 | 1/2007 | Paul et al. | |
| 7,167,044 B2 | 1/2007 | Li et al. | |
| 7,187,239 B2 | 3/2007 | Yeh | |
| 7,187,735 B2 | 3/2007 | Kent, III et al. | |
| 7,187,904 B2 | 3/2007 | Gainey et al. | |
| 7,212,788 B2 | 5/2007 | Weber et al. | |
| 7,224,231 B2 | 5/2007 | Wu | |
| 7,260,377 B2 | 8/2007 | Burns et al. | |
| 7,283,851 B2 | 10/2007 | Persico et al. | |
| 7,299,021 B2 | 11/2007 | Pärssinen et al. | |
| 7,313,368 B2 | 12/2007 | Wu et al. | |
| 7,317,894 B2 | 1/2008 | Hirose | |
| 7,333,831 B2 | 2/2008 | Srinivasan et al. | |
| 7,356,325 B2 | 4/2008 | Behzad et al. | |
| 7,372,336 B2 | 5/2008 | Lee et al. | |
| 7,403,508 B1 | 7/2008 | Miao | |
| 7,444,166 B2 | 10/2008 | Sahota | |
| 7,454,181 B2 | 11/2008 | Banister et al. | |
| 7,477,106 B2 | 1/2009 | Van Bezooijen et al. | |
| 7,486,135 B2 | 2/2009 | Mu | |
| 7,570,111 B1 | 8/2009 | Vagher et al. | |
| 7,599,675 B2 | 10/2009 | Mu et al. | |
| 7,643,847 B2 | 1/2010 | Daanen et al. | |
| 7,643,848 B2 | 1/2010 | Robinett | |
| 7,697,905 B2 | 4/2010 | Lee et al. | |
| 7,728,664 B2 | 6/2010 | Chang et al. | |
| 7,751,513 B2 | 7/2010 | Eisenhut et al. | |
| 7,764,726 B2 | 7/2010 | Simic et al. | |
| 7,848,724 B2 | 12/2010 | Bult et al. | |
| 7,869,528 B2 | 1/2011 | Robinson | |
| 7,877,075 B1 | 1/2011 | Jin et al. | |
| 7,911,269 B2 | 3/2011 | Yang et al. | |
| 7,944,298 B2 | 5/2011 | Cabanillas et al. | |
| 7,949,309 B2 | 5/2011 | Rofougaran et al. | |
| 7,952,398 B2 | 5/2011 | Salcido et al. | |
| 8,022,772 B2 | 9/2011 | Cassia et al. | |
| 8,055,229 B2 | 11/2011 | Huang | |
| 8,063,706 B2 | 11/2011 | Li et al. | |
| 8,081,672 B2 | 12/2011 | Kent et al. | |
| 8,090,332 B2 | 1/2012 | Sahota et al. | |
| 8,090,369 B2 | 1/2012 | Kitazoe | |
| 8,139,670 B1 | 3/2012 | Son et al. | |
| 8,149,955 B2 | 4/2012 | Tired | |
| 8,195,117 B2 | 6/2012 | Bult et al. | |
| 8,208,887 B2 | 6/2012 | Lee et al. | |
| 8,217,723 B2 | 7/2012 | Rajendran et al. | |
| 8,242,841 B2 | 8/2012 | Zhang | |
| 8,270,927 B2 | 9/2012 | Wallace et al. | |
| 8,290,449 B2 | 10/2012 | Keehr et al. | |
| 8,295,778 B2 | 10/2012 | Kotecha et al. | |
| 8,306,494 B2 | 11/2012 | Ojo | |
| 8,442,473 B1 | 5/2013 | Kaukovuori et al. | |
| 8,514,015 B2 | 8/2013 | Chen | |
| 8,571,510 B2 | 10/2013 | Liu et al. | |
| 8,600,315 B2 | 12/2013 | Roufoogaran et al. | |
| 8,626,084 B2 | 1/2014 | Chan et al. | |
| 8,676,148 B2 | 3/2014 | Ogasawara | |
| 8,706,069 B2 | 4/2014 | Khoini-Poorfard et al. | |
| 2002/0008575 A1 | 1/2002 | Oskowsky et al. | |
| 2002/0061773 A1 | 5/2002 | Adachi et al. | |
| 2002/0111163 A1 | 8/2002 | Hamabe | |
| 2002/0132597 A1 | 9/2002 | Peterzell et al. | |
| 2002/0173337 A1 | 11/2002 | Hajimiri et al. | |
| 2002/0193108 A1 | 12/2002 | Robinett | |
| 2003/0076797 A1 | 4/2003 | Lozano | |
| 2003/0081694 A1 | 5/2003 | Wieck | |
| 2003/0125040 A1 | 7/2003 | Walton et al. | |
| 2003/0148750 A1 | 8/2003 | Yan et al. | |
| 2003/0157915 A1 | 8/2003 | Atkinson et al. | |
| 2003/0176176 A1 | 9/2003 | Leinonen et al. | |
| 2003/0203743 A1 | 10/2003 | Sugar et al. | |
| 2003/0206076 A1 | 11/2003 | Hashemi et al. | |
| 2003/0228851 A1 | 12/2003 | Taniguchi | |
| 2004/0087290 A1 | 5/2004 | Schmidt et al. | |
| 2004/0092243 A1 | 5/2004 | Hey-Shipton | |
| 2004/0113746 A1 | 6/2004 | Brindle | |
| 2004/0116086 A1 | 6/2004 | Huttunen | |
| 2004/0121753 A1 | 6/2004 | Sugar et al. | |
| 2004/0204104 A1 | 10/2004 | Horng et al. | |
| 2004/0219959 A1 | 11/2004 | Khayrallah et al. | |
| 2004/0224643 A1 | 11/2004 | Nakai | |
| 2004/0253955 A1 | 12/2004 | Love et al. | |
| 2004/0266356 A1 | 12/2004 | Javor et al. | |
| 2005/0039060 A1 | 2/2005 | Okayasu | |
| 2005/0075077 A1 | 4/2005 | Mach et al. | |
| 2005/0079847 A1 | 4/2005 | Arafa | |
| 2005/0118977 A1 | 6/2005 | Drogi et al. | |
| 2005/0197090 A1 | 9/2005 | Stockstad et al. | |
| 2005/0215264 A1 | 9/2005 | Subramaniam et al. | |
| 2005/0231290 A1 | 10/2005 | Hung et al. | |
| 2005/0265084 A1 | 12/2005 | Choi | |
| 2005/0277387 A1 | 12/2005 | Kojima et al. | |
| 2006/0009177 A1 | 1/2006 | Persico et al. | |
| 2006/0023745 A1 | 2/2006 | Koo et al. | |
| 2006/0061773 A1 | 3/2006 | Lee et al. | |
| 2006/0121937 A1* | 6/2006 | Son ............................. 455/553.1 |
| 2006/0128322 A1 | 6/2006 | Igarashi et al. | |
| 2006/0146693 A1 | 7/2006 | Mori et al. | |
| 2006/0170503 A1 | 8/2006 | Lee et al. | |
| 2006/0189286 A1 | 8/2006 | Kyu et al. | |
| 2006/0222100 A1 | 10/2006 | Behzad | |
| 2006/0234662 A1 | 10/2006 | Diloisy | |
| 2006/0291428 A1 | 12/2006 | Filipovic | |
| 2007/0049332 A1 | 3/2007 | Higuchi | |
| 2007/0060080 A1 | 3/2007 | Nishimura et al. | |

(56) References Cited

U.S. PATENT DOCUMENTS

| | | | |
|---|---|---|---|
| 2007/0072577 A1* | 3/2007 | Rozenblit | H03B 19/14 455/333 |
| 2007/0105517 A1 | 5/2007 | Chang et al. | |
| 2007/0142013 A1 | 6/2007 | Bucknor et al. | |
| 2007/0177656 A1 | 8/2007 | Maruta et al. | |
| 2007/0177693 A1 | 8/2007 | Kluge | |
| 2007/0184801 A1 | 8/2007 | Kogawa et al. | |
| 2007/0197170 A1 | 8/2007 | Boos | |
| 2007/0197178 A1 | 8/2007 | Gu | |
| 2007/0197204 A1 | 8/2007 | Herczog et al. | |
| 2007/0202890 A1 | 8/2007 | Feher | |
| 2007/0242784 A1 | 10/2007 | Sampson et al. | |
| 2007/0243832 A1 | 10/2007 | Park et al. | |
| 2007/0262817 A1 | 11/2007 | Ciccarelli et al. | |
| 2007/0262871 A1 | 11/2007 | Yamagajo et al. | |
| 2008/0004078 A1 | 1/2008 | Barratt et al. | |
| 2008/0013654 A1 | 1/2008 | Rick et al. | |
| 2008/0116976 A1 | 5/2008 | Chang et al. | |
| 2008/0117999 A1 | 5/2008 | Kadous et al. | |
| 2008/0139151 A1* | 6/2008 | Ojo et al. | 455/234.1 |
| 2008/0204148 A1 | 8/2008 | Kim et al. | |
| 2008/0224770 A1 | 9/2008 | Kim et al. | |
| 2008/0224791 A1 | 9/2008 | Cheng | |
| 2008/0225971 A1 | 9/2008 | Behzad | |
| 2008/0261650 A1 | 10/2008 | Piriyapoksombut et al. | |
| 2008/0297259 A1 | 12/2008 | Mu | |
| 2009/0117938 A1* | 5/2009 | Georgantas | H04B 1/0028 455/552.1 |
| 2009/0124227 A1 | 5/2009 | Ishiguro | |
| 2009/0227214 A1* | 9/2009 | Georgantas et al. | 455/86 |
| 2009/0237161 A1 | 9/2009 | Fagg | |
| 2009/0243869 A1 | 10/2009 | Sanderford, Jr. | |
| 2009/0253456 A1 | 10/2009 | Toh et al. | |
| 2009/0290659 A1 | 11/2009 | Petrovic et al. | |
| 2009/0323779 A1 | 12/2009 | Lennen | |
| 2010/0019970 A1 | 1/2010 | Farrokhi et al. | |
| 2010/0034094 A1 | 2/2010 | Tenny | |
| 2010/0040178 A1 | 2/2010 | Sutton et al. | |
| 2010/0041359 A1 | 2/2010 | Liu et al. | |
| 2010/0142440 A1 | 6/2010 | Inoue | |
| 2010/0195754 A1 | 8/2010 | Li et al. | |
| 2010/0197263 A1 | 8/2010 | Dwyer et al. | |
| 2010/0210226 A1 | 8/2010 | Matsuyama | |
| 2010/0210272 A1 | 8/2010 | Sundstrom et al. | |
| 2010/0210299 A1 | 8/2010 | Gorbachov | |
| 2010/0214184 A1 | 8/2010 | Tran et al. | |
| 2010/0225414 A1 | 9/2010 | Gorbachov | |
| 2010/0226327 A1 | 9/2010 | Zhang et al. | |
| 2010/0232493 A1 | 9/2010 | Thirumoorthy | |
| 2010/0237947 A1 | 9/2010 | Xiong et al. | |
| 2010/0253435 A1 | 10/2010 | Ichitsubo et al. | |
| 2010/0265875 A1 | 10/2010 | Zhao et al. | |
| 2010/0271986 A1 | 10/2010 | Chen | |
| 2010/0272051 A1 | 10/2010 | Fu et al. | |
| 2010/0301946 A1 | 12/2010 | Borremans | |
| 2010/0311378 A1 | 12/2010 | Tasic et al. | |
| 2010/0328155 A1 | 12/2010 | Simic et al. | |
| 2010/0330977 A1 | 12/2010 | Kadous et al. | |
| 2011/0018635 A1 | 1/2011 | Tasic et al. | |
| 2011/0044380 A1 | 2/2011 | Marra et al. | |
| 2011/0050319 A1 | 3/2011 | Wong | |
| 2011/0084791 A1 | 4/2011 | Mun et al. | |
| 2011/0086603 A1 | 4/2011 | Toosi et al. | |
| 2011/0110463 A1 | 5/2011 | Chang et al. | |
| 2011/0122972 A1 | 5/2011 | Lie et al. | |
| 2011/0165848 A1 | 7/2011 | Gorbachov et al. | |
| 2011/0193625 A1 | 8/2011 | Gatta et al. | |
| 2011/0194504 A1 | 8/2011 | Gorokhov et al. | |
| 2011/0204973 A1 | 8/2011 | Hu et al. | |
| 2011/0211533 A1 | 9/2011 | Casaccia et al. | |
| 2011/0217945 A1 | 9/2011 | Uehara et al. | |
| 2011/0222443 A1 | 9/2011 | Khlat | |
| 2011/0222444 A1 | 9/2011 | Khlat et al. | |
| 2011/0242999 A1 | 10/2011 | Palanki et al. | |
| 2011/0250926 A1 | 10/2011 | Wietfeldt et al. | |
| 2011/0268048 A1 | 11/2011 | Toskala et al. | |
| 2011/0268232 A1 | 11/2011 | Park et al. | |
| 2011/0292844 A1 | 12/2011 | Kwun et al. | |
| 2011/0299434 A1 | 12/2011 | Gudem et al. | |
| 2011/0300810 A1 | 12/2011 | Mikhemar et al. | |
| 2012/0009886 A1 | 1/2012 | Poulin | |
| 2012/0013387 A1 | 1/2012 | Sankaranarayanan et al. | |
| 2012/0026862 A1 | 2/2012 | Sadri et al. | |
| 2012/0044927 A1 | 2/2012 | Pan et al. | |
| 2012/0056681 A1 | 3/2012 | Lee | |
| 2012/0057621 A1 | 3/2012 | Hong et al. | |
| 2012/0195237 A1 | 8/2012 | Chan et al. | |
| 2012/0236829 A1 | 9/2012 | Takano et al. | |
| 2012/0293265 A1* | 11/2012 | Heikkinen et al. | 330/291 |
| 2012/0294299 A1 | 11/2012 | Fernando | |
| 2012/0327825 A1 | 12/2012 | Gudem et al. | |
| 2012/0329395 A1 | 12/2012 | Husted et al. | |
| 2013/0003617 A1 | 1/2013 | Gudem et al. | |
| 2013/0003783 A1 | 1/2013 | Gudem et al. | |
| 2013/0043946 A1 | 2/2013 | Hadjichristos et al. | |
| 2013/0051284 A1 | 2/2013 | Khlat | |
| 2013/0114769 A1 | 5/2013 | Fernando | |
| 2013/0163492 A1 | 6/2013 | Wong | |
| 2013/0217398 A1 | 8/2013 | Winiecki et al. | |
| 2013/0230080 A1 | 9/2013 | Gudem et al. | |
| 2013/0265892 A1 | 10/2013 | Fernando | |
| 2013/0315348 A1 | 11/2013 | Tasic et al. | |
| 2013/0316668 A1 | 11/2013 | Davierwalla et al. | |
| 2013/0316669 A1 | 11/2013 | Davierwalla et al. | |
| 2013/0316670 A1 | 11/2013 | Tasic et al. | |
| 2013/0329665 A1 | 12/2013 | Kadous et al. | |
| 2014/0072001 A1 | 3/2014 | Chang et al. | |
| 2014/0113578 A1 | 4/2014 | Xu et al. | |
| 2014/0269853 A1 | 9/2014 | Gudem et al. | |

FOREIGN PATENT DOCUMENTS

| | | |
|---|---|---|
| CN | 101228702 A | 7/2008 |
| CN | 101242158 A | 8/2008 |
| CN | 101523967 A | 9/2009 |
| CN | 101789805 A | 7/2010 |
| EP | 1164719 A1 | 12/2001 |
| EP | 1370012 | 12/2003 |
| EP | 1398887 A1 | 3/2004 |
| EP | 1708372 A2 | 10/2006 |
| EP | 1726098 A1 | 11/2006 |
| EP | 1748567 A2 | 1/2007 |
| EP | 1761076 A2 | 3/2007 |
| EP | 2068583 A1 | 6/2009 |
| EP | 2141818 A1 | 1/2010 |
| EP | 1916767 B1 | 12/2010 |
| EP | 2393205 A2 | 12/2011 |
| EP | 2398285 A1 | 12/2011 |
| GB | 2472978 A | 3/2011 |
| JP | 05227234 | 9/1993 |
| JP | H0730452 A | 1/1995 |
| JP | 07221684 | 8/1995 |
| JP | 9027778 A | 1/1997 |
| JP | 09116458 | 5/1997 |
| JP | H11127300 A | 5/1999 |
| JP | 2000013278 A | 1/2000 |
| JP | 2001285114 | 10/2001 |
| JP | 2002261880 A | 9/2002 |
| JP | 2004015162 A | 1/2004 |
| JP | 2006520143 A | 8/2006 |
| JP | 2007324711 A | 12/2007 |
| JP | 2008085793 A | 4/2008 |
| JP | 2008519535 A | 6/2008 |
| JP | 2009027778 | 2/2009 |
| JP | 2009130867 A | 6/2009 |
| JP | 2011015112 A | 1/2011 |
| JP | 2011082669 A | 4/2011 |
| JP | 2011091747 A | 5/2011 |
| JP | 2011119807 A | 6/2011 |
| WO | WO0150636 | 7/2001 |
| WO | 0237686 | 5/2002 |
| WO | WO2005039060 | 4/2005 |
| WO | 2005062477 A2 | 7/2005 |
| WO | WO2005064816 A1 | 7/2005 |

(56) References Cited

FOREIGN PATENT DOCUMENTS

| WO | WO-2005088847 A1 | 9/2005 |
|----|------------------|--------|
| WO | 2006050515 A2 | 5/2006 |
| WO | 2006118538 A2 | 11/2006 |
| WO | 2008059257 A1 | 5/2008 |
| WO | 2008084539 A1 | 7/2008 |
| WO | 2008092745 A1 | 8/2008 |
| WO | WO-2008103757 | 8/2008 |
| WO | 2008145604 A1 | 12/2008 |
| WO | 2010059257 A1 | 5/2010 |
| WO | WO-2011019850 A1 | 2/2011 |
| WO | 2011050729 A1 | 5/2011 |
| WO | 2011092005 A1 | 8/2011 |
| WO | 2011138697 A1 | 11/2011 |
| WO | 2012008705 A2 | 1/2012 |
| WO | 2012049529 A1 | 4/2012 |
| WO | 2013036794 A1 | 3/2013 |
| WO | 2013131047 | 9/2013 |

OTHER PUBLICATIONS

Hwang, et al., "A High IIP2 Direct-Conversion Receiver using Even-Harmonic Reduction Technique for Cellular CDMA/PCS/GPS applications," IEEE Transaction on Circuits and Systems.

MSM6000 Chipset Solution, Qualcomm Incorporated.

MSM6500 Chipset Solution, Qualcomm Incorporated.

Sever et al. "A Dual-Antenna Phase-Array Ultra-Wideband CMOS Transceiver". IEEE Communications Magazine [Online] 2006, vol. 44, Issue 8, pp. 102-110. See pp. 104-107.

Winternitz, et al., "A GPS Receiver for High-Altitude Satellite Navigation," IEEE Journal of Selected Topics in Signal Processing, vol. 3, No. 4, pp. 541-556, Aug. 2009.

Philips: "Capabilities of multi-transceiver UES", 3GPP Draft; R1-103913, 3rd Generation Partnership Project (3GPP), Mobile Competence Centre; 650, Route Des Lucioles; F-06921 Sophia-Antipolis Cedex; France, vol. RAN WG1, no. Dresden, Germany; 20100628, Jun. 22, 2010, XP050449298, [retrieved on Jun. 22, 2010] the whole document.

3GPP TS 36.101 V11.0.0, 3rd Generation Partnership Project; Technical Specification Group Radio Access Network; Evolved Universal Terrestrial Radio Access (E-UTRA); User Equipment (UE) radio transmission and reception (Release 11), Mar. 2012.

Broyde F., et al., "The Noise Performance of aMultiple-Input-Port and Multiple-Output-Port Low-Noise Amplifier Connected to an Array of Coupled Antennas," International Journal of Antennas and Propagation, vol. 2011, Article ID 438478, Jul. 18, 2011, 12 pages.

Chen, et al, "A 5-6 GHz 1-V CMOS Direct-Conversion Receiver With an Integrated Quadrature Coupler," IEEE Journal of Solid-State Circuits, vol. 42, No. 9, 2007, pp. 1963-1975.

Chen, et al., "A monolithic 5.9-GHz CMOS I/Q direct-down converter utilizing a quadrature coupler and transformer-coupled subharmonic mixers," Microwave and Wireless Components Letters, IEEE , vol. 16, No. 4, 2006, pp. 197-199.

Garuda, et al., "A Multi-band CMOS RF Front-end for 4G WiMAX and WLAN Applications," 2006 IEEE International Symposium on Circuits and Systes, 2006. ISCAS 2006. May 2006, 4 pages.

Hashemi, et al., "Concurrent Multiband Low-Noise Amplifiers—Theory, Design, and Applications," IEEE Transactions on Microwave Theory and Techniques, vol. 50, No. 1, Jan. 2002.

Henrik M et al., "A Full Duplex Front End Module for WiFi 802.11.n. Applications", European Microwave Association, vol. 12, No. 4, Oct. 2008, pp. 162-165.

International Search Report and Written Opinion—PCT/US2013/028742—ISA/EPO—Jul. 11, 2013.

Jones W. W., et al., "Narrowband interference suppression using filter-bank analysis/synthesis techniques", Military Communications Conference, 1992. MILC0M '92, Conference Rec0r D. Communications—Fusing Command, Control and Intelligence., IEEE San Diego, CA, USA, 11 Oct. 14, 1992, New York, NY, USA, IEEE, US, Oct. 11, 1992, pp. 898-902, XP010060840, DOI: 10.1109/MILCOM.1992.243977, ISBN: 978-0-7803-0585-4.

Jussi R et al., "A Dual-Band RF Front-End for WCDMA and GSM Applications", IEEE, Journal Solid-State Circuits, 2001, vol. 36, No. 8, pp. 1198-1204.

Kevin W et al., "3G/4G Multimode Cellular Front End Challenges", Part 2: Architecture Discussion, RFMD® White Paper, 9 pages.

Kim, T.W., et al., Highly Linear Receiver Front-End Adopting MOSFET Transconductance Linearization by Multiple Gated Transistors, IEEE Journal of Solid-State Circuits, United States, IEEE, Jan. 1, 2004, vol. 39, No. 1, pp. 223-229.

Lai, C.M.,et al., "Compact router transceiver architecture for carrier aggregation systems", Microwave Conference (EUMC), 2011 41st European, IEEE, Oct. 10, 2011, pp. 693-696, XP032072825, ISBN: 978-1-61284-235-6 the whole document.

Lee et al., "Development of Miniature Quad SAW filter bank based on PCB substrate", IEEE Intl Frequency Control Symp, pp. 146-149, 2007.

Pitschi M. et al., "High Performance Microwave Acoustic Components for Mobile Radios", Ultrasonics Symposium (IUS), 2009 IEEE International, EPCOS AG, Munich, Germany, vol. 1, Sep. 20-23, 2009.

Qualcomm Europe: "UE Implementation Impact due to 4C-HSDPA Operation", 3GPP Draft; R1-094067_UE_Impl_Impact_4C_HSDPA, 3rd Generation Partnership Project (3GPP), Mobile Competence Centre; 650, Route Des Lucioles; F-06921 Sophia-Antipolis Cedex ; France, No. Miyazaki; 20091012, Oct. 12, 2009, XP050388547, [retrieved on Oct. 6, 2009].

Rahn D.G., et al., "A fully integrated multiband MIMO WLAN transceiver RFIC," IEEE J. Solid-State Circuits, 2005, vol. 40 (8), 1629-1641.

Tasic A. et al., "Design of Adaptive Multimode RF Front-End Circuits", IEEE Journal of Solid-State Circuits, vol. 42, Issue 2, Feb. 2007 pp. 313-322.

"UMTS Picocell Front End Module", CTS Corp. 8 pages.

\* cited by examiner

SINGLE CHIP SIGNAL SPLITTING CARRIER AGGREGATION RECEIVER ARCHITECTURE

TECHNICAL FIELD

The present disclosure relates generally to wireless devices for communication systems. More specifically, the present disclosure relates to systems and methods for a single-chip signal splitting carrier aggregation receiver architecture.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may communicate wirelessly with each other and with a network. As the demand for information by these electronic devices has increased, the downlink throughput has also increased. One such way to increase downlink throughput is the use of carrier aggregation. In carrier aggregation, multiple carriers may be aggregated on the physical layer to provide the required bandwidth (and thus the required throughput).

It may be desirable for an electronic device to maximize battery life. Because an electronic device often runs on a battery with a limited operation time, reductions in the power consumption of an electronic device may increase the desirability and functionality of the electronic device.

The electronic devices have also become smaller and cheaper. To facilitate both the decrease in size and the decrease in cost, additional circuitry and more complex circuitry are being used on integrated circuits. Thus, any reduction in the die area used by circuitry may reduce both the size and cost of an electronic device. Benefits may be realized by improvements to electronic devices that allow an electronic device to participate in carrier aggregation while minimizing the cost and size of the electronic device while also minimizing the power consumption of the electronic device.

SUMMARY

A wireless communication device configured for receiving a multiple carrier signal is described. The wireless communication device includes a single-chip signal splitting carrier aggregation receiver architecture. The single-chip signal splitting carrier aggregation receiver architecture includes a primary antenna, a secondary antenna and a transceiver chip. The single-chip signal splitting carrier aggregation receiver architecture reuses a simultaneous hybrid dual receiver path.

The single-chip signal splitting carrier aggregation receiver architecture may not require four antennas, a power splitter, an external low noise amplifier or die-to-die signal routing. The transceiver chip may include a transmitter, a primary receiver, a secondary receiver, a tertiary receiver and a quaternary receiver. Each receiver may include multiple low noise amplifiers. Each low noise amplifier may include a first stage amplifier and a second stage amplifier. The first stage amplifier may be a transconductance stage and the second stage amplifier may be a cascode stage.

The multiple low noise amplifiers may include multiple low noise amplifiers for a first band and multiple low noise amplifiers for a second band. In one configuration, the first band may be a low band and the second band may be a mid band. In another configuration, the first band may be a low band and the second band may be a high band. In yet another configuration, the first band may be a mid band and the second band may be a high band.

A first routing may be used from the primary antenna through the primary receiver to obtain a primary inphase/quadrature signal. A second routing may be used from the primary antenna through the tertiary receiver to obtain a TRx inphase/quadrature signal. A third routing may be used from the secondary antenna through the secondary receiver to obtain a secondary inphase/quadrature signal. A fourth routing may be used from the secondary antenna through the quaternary receiver to obtain a QRx inphase/quadrature signal.

The single-chip signal splitting carrier aggregation receiver architecture may be in inter-band operation. The first routing may pass through a first primary receiver low noise amplifier. The second routing may pass through a second primary receiver low noise amplifier. The second routing may also pass through a first signal splitting stage. The third routing may pass through a first secondary receiver low noise amplifier. The fourth routing may pass through a second secondary receiver low noise amplifier. The fourth routing may also pass through a second signal splitting stage.

The first signal splitting stage may include a routing between a first stage amplifier in a low noise amplifier of the primary receiver and a second stage amplifier in a low noise amplifier of the tertiary receiver. The second signal splitting stage may include a routing between a first stage amplifier in a low noise amplifier of the secondary receiver and a second stage amplifier in a low noise amplifier of the quaternary receiver.

The first signal splitting stage may include a routing between a second stage amplifier in a low noise amplifier of the primary receiver and a mixer in the tertiary receiver. The second signal splitting stage may include a routing between a second stage amplifier in a low noise amplifier of the secondary receiver and a mixer in the quaternary receiver.

The single-chip signal splitting carrier aggregation receiver architecture may be in intra-band operation. The first routing and the second routing may pass through a primary receiver low noise amplifier. The second routing may also pass through a first signal splitting stage. The third routing and the fourth routing may pass through a secondary receiver low noise amplifier. The fourth routing may also pass through a second signal splitting stage.

The first signal splitting stage may include a routing between a first stage amplifier in a low noise amplifier of the primary receiver and a second stage amplifier in a low noise amplifier of the tertiary receiver. The second signal splitting stage may include a routing between a first stage amplifier in a low noise amplifier of the secondary receiver and a second stage amplifier in a low noise amplifier of the quaternary receiver.

The first signal splitting stage may include a routing between a second stage amplifier in a low noise amplifier of the primary receiver and a mixer in the tertiary receiver. The second signal splitting stage may include a routing between a second stage amplifier in a low noise amplifier of the secondary receiver and a mixer in the quaternary receiver.

A method for receiving a multiple carrier signal using a single-chip signal splitting carrier aggregation receiver architecture is also described. A first signal is received using a primary antenna. The first signal is routed through a primary receiver on a transceiver chip in the single-chip signal splitting carrier aggregation receiver architecture to obtain a primary inphase/quadrature signal. The first signal is routed through a tertiary receiver on the transceiver chip to obtain a TRx inphase/quadrature signal. A second signal is received using a secondary antenna. The second signal is routed through a secondary receiver on the transceiver chip to obtain a secondary inphase/quadrature signal. The second signal is routed through a quaternary receiver on the transceiver chip to obtain a QRx inphase/quadrature signal.

An apparatus for receiving a multiple carrier signal using a single-chip signal splitting carrier aggregation receiver architecture is described. The apparatus includes means for receiving a first signal using a primary antenna. The apparatus also includes means for routing the first signal through a primary receiver on a transceiver chip in the single-chip signal splitting carrier aggregation receiver architecture to obtain a primary inphase/quadrature signal. The apparatus further includes means for routing the first signal through a tertiary receiver on the transceiver chip to obtain a TRx inphase/quadrature signal. The apparatus also includes means for receiving a second signal using a secondary antenna. The apparatus further includes means for routing the second signal through a secondary receiver on the transceiver chip to obtain a secondary inphase/quadrature signal. The apparatus also includes means for routing the second signal through a quaternary receiver on the transceiver chip to obtain a QRx inphase/quadrature signal.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

3GPP specifications are based on evolved Global System for Mobile Communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS third generation (3G) networks, incorporating a CDMA air interface. Release 6 integrates operation with wireless local area networks (LAN) networks and adds High Speed Uplink Packet Access (HSUPA). Release 8 introduces dual downlink carriers and Release 9 extends dual carrier operation to uplink for UMTS.

CDMA2000 is a family of $3^{rd}$ generation (3G) technology standards that use code division multiple access (CDMA) to send voice, data and signaling between wireless devices. CDMA2000 may include CDMA2000 1×, CDMA2000 EV-DO Rev. 0, CDMA2000 EV-DO Rev. A and CDMA2000 EV-DO Rev. B. 1× or 1×RTT refers to the core CDMA2000 wireless air interface standard. 1× more specifically refers to 1 times Radio Transmission Technology and indicates the same radio frequency (RF) bandwidth as used in IS-95. 1×RTT adds 64 additional traffic channels to the forward link. EV-DO refers to Evolution-Data Optimized. EV-DO is a telecommunications standard for the wireless transmission of data through radio signals.

Figure 1:
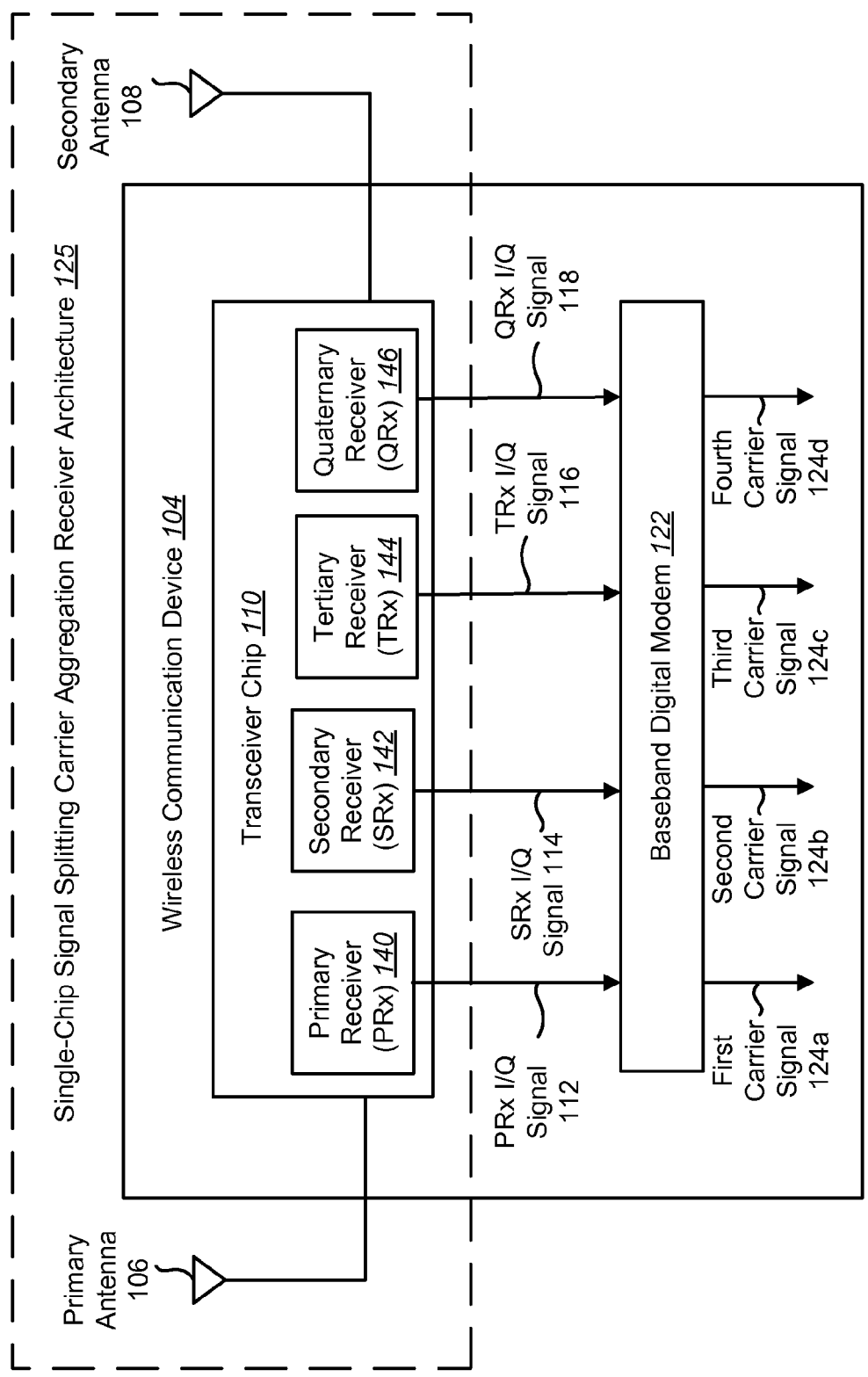
FIG. 1 shows a wireless communication device for use in the present systems and methods.

FIG. 1 shows a wireless communication device 104 for use in the present systems and methods. A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, a PC card, compact flash, an external or internal modem, a wireline phone, etc. A wireless communication device 104 may be mobile or stationary. A wireless communication device 104 may communicate with zero, one or multiple base stations on a downlink and/or an uplink at any given moment. The downlink (or forward link) refers to the communication link from a base station to a wireless communication device 104, and the uplink (or reverse link) refers to the communication link from a wireless communication device 104 to a base station. Uplink and downlink may refer to the communication link or to the carriers used for the communication link.

A wireless communication device 104 may operate in a wireless communication system that includes other wireless devices, such as base stations. A base station is a station that communicates with one or more wireless communication devices 104. A base station may also be referred to as, and may include some or all of the functionality of, an access point, a broadcast transmitter, a Node B, an evolved Node B, etc. Each base station provides communication coverage for a particular geographic area. A base station may provide communication coverage for one or more wireless communication devices 104. The term "cell" can refer to a base station and/or its coverage area, depending on the context in which the term is used.

Communications in a wireless communication system (e.g., a multiple-access system) may be achieved through transmissions over a wireless link. Such a communication link may be established via a single-input and single-output (SISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The wireless communication device 104 may utilize signal splitting. In signal splitting, signals are directed to a specific path. One form of signal splitting is current steering. In one configuration of intra-band carrier aggregation, signal splitting refers to taking a signal from the output of a first stage amplifier (such as a transconductance stage (Gm)), splitting the signal and piping the signal into two separate second stage amplifiers (such as cascode stages (Cas)) and subsequent mixers for carrier aggregation. In another configuration of intra-band carrier aggregation, signal splitting refers to taking a signal from the output of a second stage amplifier (such as a cascode stage (Cas)), splitting the signal and piping the signal into two separate mixers for carrier aggregation.

In one configuration of inter-band carrier aggregation, signal splitting refers to taking a signal output from a first stage amplifier (such as a transconductance stage (Gm)) and steering (or diverting or pumping) the signal into a second stage amplifier (such as a cascode stage (Cas)) and subsequent mixer in a diversity path, to be downconverted using the downconverting circuitry of the diversity receiver. In another configuration of inter-band carrier aggregation, signal splitting refers to taking a signal output from a second stage amplifier (such as a cascode stage (Cas)) and steering (or diverting or pumping) the signal into a subsequent mixer in a diversity path to be downconverted using the downconverting circuitry of the diversity receiver.

The signal steering herein is current steering. However, voltage steering may also be used. In one configuration of voltage steering for inter-band carrier aggregation, a signal output from a first stage amplifier (such as a transconductance stage (Gm)) may be diverted to a second stage amplifier (such as a cascode stage (Cas)) and subsequent mixer in a diversity path to be downconverted using downconverting circuitry of the diversity receiver. In another configuration of voltage steering for inter-band carrier aggregation, a signal output from a second stage amplifier (such as a cascode stage (Cas)) may be diverted to a subsequent mixer in a diversity path to be downconverted using the downconverting circuitry of the diversity receiver.

The wireless communication device 104 may include a primary antenna 106 and a secondary antenna 108. The secondary antenna 108 may be referred to as the diversity antenna. A transceiver chip 110 may be coupled to the primary antenna 106 and the secondary antenna 108. The transceiver chip 110 may include a transmitter, a primary receiver (PRx) 140, a secondary receiver (SRx) 142, a tertiary receiver (TRx) 144 and a quaternary receiver (QRx) 146. The primary receiver (PRx) 140 of the transceiver chip 110 may output a PRx inphase/quadrature (I/Q) signal 112 to a baseband digital modem 122 on the wireless communication device 104. The secondary receiver (SRx) 142 of the transceiver chip 110 may output a SRx inphase/quadrature (I/Q) signal 114 to the baseband digital modem 122. The tertiary receiver (TRx) 144 of the transceiver chip 110 may output a TRx inphase/quadrature (I/Q) signal 116 to the baseband digital modem 122. The quaternary receiver (QRx) 146 of the transceiver chip 110 may output a QRx inphase/quadrature (I/Q) signal 118 to the baseband digital modem 122. The configuration of the primary antenna 106, the secondary antenna 108 and the transceiver chip 110 may be referred to as a single-chip signal splitting carrier aggregation receiver architecture 125. The single-chip signal splitting carrier aggregation receiver architecture 125 may be implemented with only a single chip to achieve board area reduction without performance degradation for legacy modes (diversity and simultaneous dual hybrid receiver (SHDR)).

In general, the single-chip signal splitting carrier aggregation receiver architecture 125 may split the signal received by the primary antenna 106 into the PRx inphase/quadrature (I/Q) signal 112 and the TRx inphase/quadrature (I/Q) signal 116 using a routing between a source low noise amplifier (LNA) in the primary receiver (PRx) 140 and a target low noise amplifier (LNA) in the tertiary receiver (TRx) 144. The routing is discussed in additional detail below in relation to FIG. 4, FIG. 5, FIG. 6 and FIG. 7. The single-chip signal splitting carrier aggregation receiver architecture 125 may also split the signal received by the secondary antenna 108 into the SRx inphase/quadrature (I/Q) signal 114 and the QRx inphase/quadrature (I/Q) signal 118 using a routing between a source low noise amplifier (LNA) in the secondary receiver (SRx) 142 and a target low noise amplifier (LNA) in the quaternary receiver (QRx) 146. This routing is also discussed in additional detail below in relation to FIG. 4, FIG. 5, FIG. 6 and FIG. 7. As used herein, source low noise amplifier (LNA) refers to a low noise amplifier (LNA) from which a signal routing is taken and target low noise amplifier (LNA) refers to a low noise amplifier (LNA) to which the signal routing is directed.

There may be many different ways to split the signals (for either or both the signal received by the primary antenna 106 and the signal received by the secondary antenna 108). In one configuration, a signal output from a first stage in the source low noise amplifier (LNA) (e.g., a transconductance stage (Gm)) may be routed to a second stage in the target low noise amplifier (LNA) (e.g., a cascode stage (Cas)). In another configuration, a signal output from a first stage in the source low noise amplifier (LNA) (e.g., a transconductance stage (Gm)) may be routed to a second stage in the target low noise amplifier (LNA) (e.g., a transformer used to split the signal).

The wireless communication device 104 may use a single-chip signal splitting carrier aggregation receiver architecture 125 that reuses the simultaneous hybrid dual receiver (SHDR) path for carrier aggregation. One advantage of the single-chip signal splitting carrier aggregation receiver architecture 125 of the present systems and methods is the ability to operate using only two antennas. Because a wireless communication device 104 with fewer antennas is cheaper, less bulky and less complicated, a wireless communication device 104 with the minimum number of antennas may be advantageous.

The wireless communication device 104 of the present systems and methods does not require the use of a power splitter. By removing a power splitter from the wireless communication device 104, the wireless communication device 104 may consume less power. Furthermore, the lack of a power splitter may reduce the cost of the wireless communication device 104 and free up die area. The single-chip signal splitting carrier aggregation receiver architecture 125 of the present systems and methods may also not require the use of external low noise amplifiers (LNAs). External low noise amplifiers (LNAs) may consume large amounts of power and increase the cost of a wireless communication device 104. Another benefit of the single-chip signal splitting carrier aggregation receiver architecture 125 of the present systems and methods is the ability to operate without die-to-die signal routing. Removing die-to-die signal routing may reduce both the complexity and cost of the wireless communication device 104. Removing die-to-die signaling may also allow for optimal placement of antennas on the wireless communication device 104. The single-chip signal splitting carrier aggregation receiver architecture 125 may have only two synthesizers running.

The baseband digital modem 122 may perform processing on the PRx inphase/quadrature (I/Q) signal 112, the SRx inphase/quadrature (I/Q) signal 114, the TRx inphase/quadrature (I/Q) signal 116 and the QRx inphase/quadrature (I/Q) signal 118. For example, the baseband digital modem 122 may convert the signals to the digital domain using analog-to-digital converters (ADCs) and perform digital processing on the signals using digital signal processors (DSPs). The baseband digital modem 122 may then output a first carrier signal 124a, a second carrier signal 124b, a third carrier signal 124c and a fourth carrier signal 124d. A carrier signal 124 may refer to the carrier that the signal used.

In one configuration, the first carrier signal 124a and the second carrier signal 124b may be located in a low band while the third carrier signal 124c and the fourth carrier signal 124d are located within a midband. This may be referred to as inter-band operation or Dual-Band 4-Carrier according to Rel-10. Inter-band operation is discussed in additional detail below in relation to FIG. 4 and FIG. 5 below. In another configuration, the first carrier signal 124a, second carrier signal 124b, third carrier signal 124c and fourth carrier signal 124d may all be located within a single band, such as the low band. This may be referred to as intra-band operation or Single-Band 4-Carrier in Release-10. Intra-band operation is discussed in additional detail below in relation to FIG. 6 and FIG. 7 below.

Figure 2:
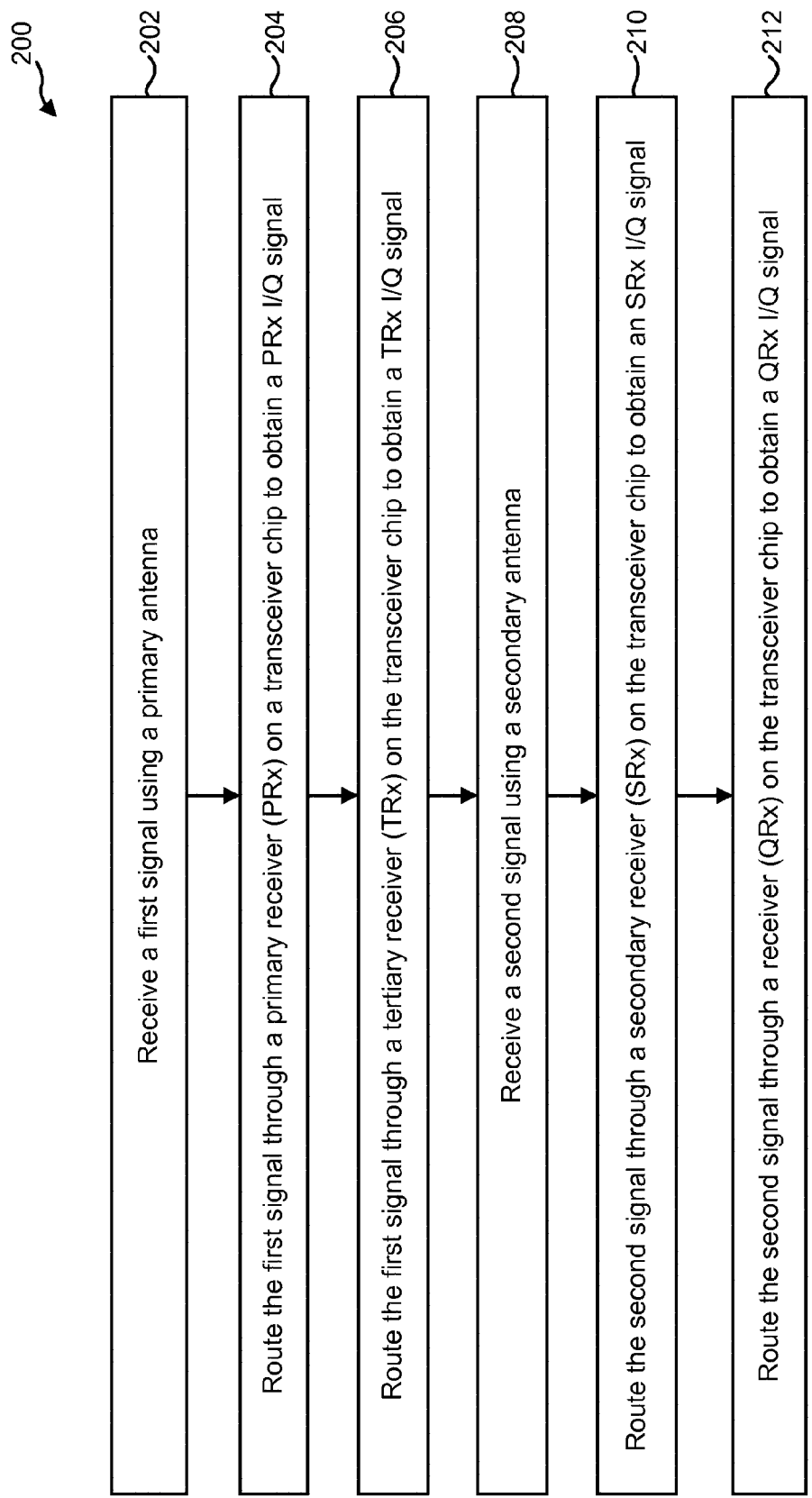
FIG. 2 is a flow diagram of a method for receiving signals using a single-chip signal splitting carrier aggregation receiver architecture.

FIG. 2 is a flow diagram of a method 200 for receiving signals using a single-chip signal splitting carrier aggregation receiver architecture 125. The method 200 may be performed by a wireless communication device 104. The wireless communication device 104 may be operating in either inter-band mode or intra-band mode. In inter-band mode, the wireless communication device 104 may receive four carrier signals; two within a first band and two within a second band. In intra-band mode, the wireless communication device 104 may receive four carrier signals within a single band.

The wireless communication device 104 may receive 202 a first signal using a primary antenna 106. The wireless communication device 104 may route 204 the first signal through a primary receiver (PRx) 140 on a transceiver chip 110 to obtain a PRx inphase/quadrature (I/Q) signal 112. The wireless communication device 104 may also route 206 the first signal through a tertiary receiver (TRx) 144 on the transceiver chip 110 to obtain a TRx inphase/quadrature (I/Q) signal 116.

The wireless communication device 104 may also receive 208 a second signal using a secondary antenna 108. The wireless communication device 104 may route 210 the second signal through a secondary receiver (SRx) 142 on the transceiver chip 110 to obtain a SRx inphase/quadrature (I/Q) signal 114. The wireless communication device 104 may route 212 the second signal through a quaternary receiver (QRx) 146 on the transceiver chip 110 to obtain a QRx inphase/quadrature (I/Q) signal 118.

Figure 3:
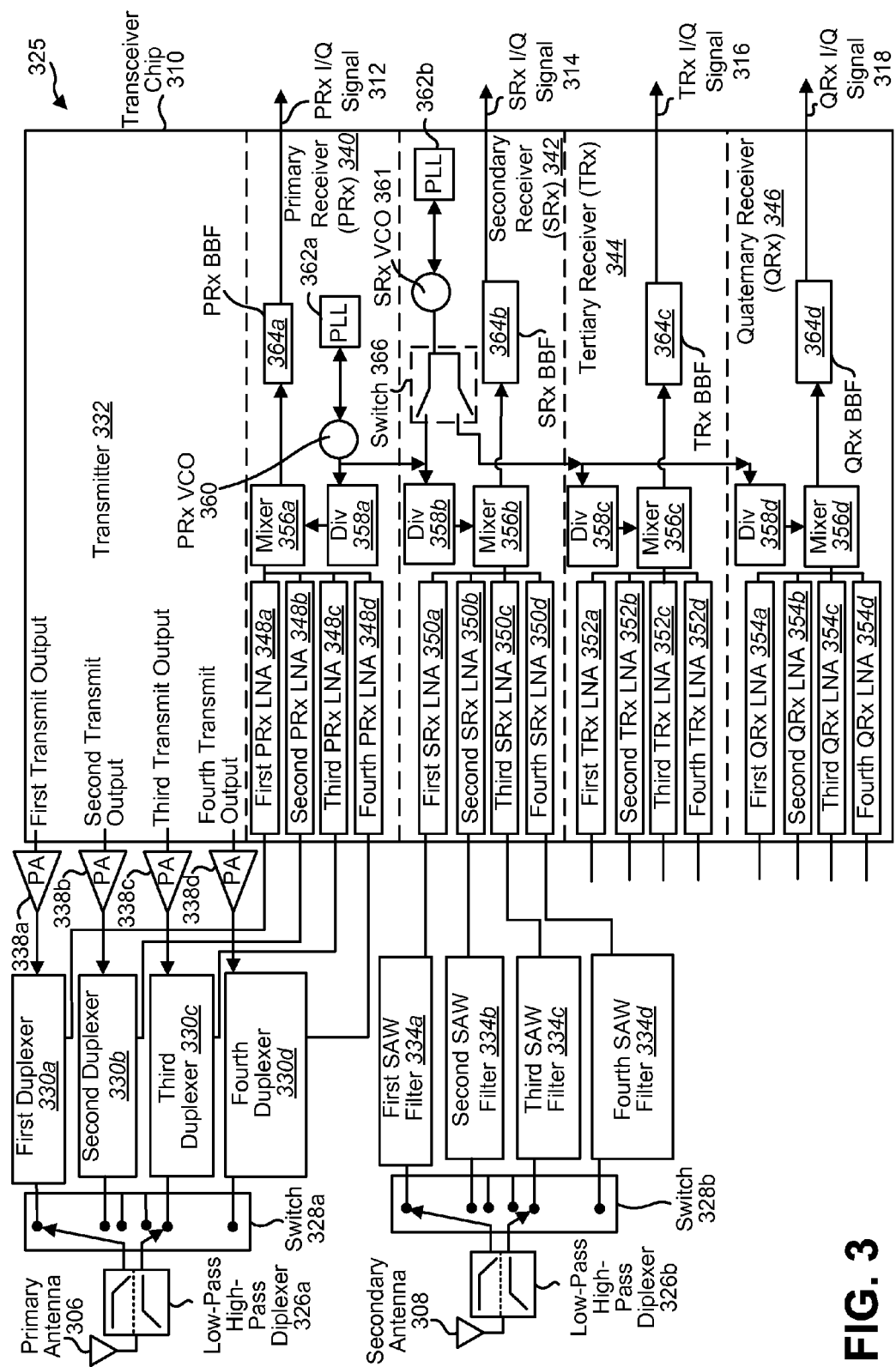
FIG. 3 is a block diagram illustrating a single-chip signal splitting carrier aggregation receiver architecture.

FIG. 3 is a block diagram illustrating a single-chip signal splitting carrier aggregation receiver architecture 325. The single-chip signal splitting carrier aggregation receiver architecture 325 of FIG. 3 may be one configuration of the single-chip signal splitting carrier aggregation receiver architecture 125 of FIG. 1. The single-chip signal splitting carrier aggregation receiver architecture 325 may include a primary antenna 306, a first low-pass high-pass diplexer 326a, a first switch 328a, four duplexers 330a-d, a secondary antenna 308, a second low-pass high-pass diplexer 326b, a second switch 328b, four surface acoustic wave (SAW) filters 334a-d and a transceiver chip 310.

The primary antenna 306 may be coupled to the first low-pass high-pass diplexer 326a. A low-pass high-pass diplexer 326 may bundle low band frequencies into one signal and high band (or midband) frequencies into another signal, thus allowing the primary antenna 306 to pass both low band and midband signals to the transceiver chip 310. The first low-pass high-pass diplexer 326a may be coupled to the first switch 328a. The first switch 328a may have two inputs (the signal that includes the bundled low band frequencies and the signal that includes the bundled high band frequencies) and multiple outputs. In one configuration, the first switch 328a may have six possible outputs to the four duplexers 330 (representing the six possible configurations of duplexer 330 pairs). The four duplexers 330 may include a first duplexer 330a, a second duplexer 330b, a third duplexer 330c and a fourth duplexer 330d. In one configuration, the first duplexer 330a and the second duplexer 330b may be used for a low band while the third duplexer 330c and the fourth duplexer 330d are used for a midband.

The transceiver chip 310 may include a transmitter 332, a primary receiver (PRx) 340, a secondary receiver (SRx) 342, a tertiary receiver (TRx) 344 and a quaternary receiver (QRx) 346. The transmitter 332 may include four transmit outputs: a first transmit output, a second transmit output, a third transmit output and a fourth transmit output. In one configuration, the first transmit output and the second transmit output may be low band outputs while the third transmit output and the fourth transmit output are midband outputs.

The first transmit output may be coupled to the first duplexer 330a via a power amplifier (PA) 338a. The second transmit output may be coupled to the second duplexer 330b via a power amplifier 338b. The third transmit output may be coupled to the third duplexer 330c via a power amplifier 338c. The fourth transmit output may be coupled to the fourth duplexer 330d via a power amplifier 338d.

The primary receiver (PRx) 340 may include a first PRx low noise amplifier (LNA) 348a coupled to the first duplexer 330a, a second PRx low noise amplifier (LNA) 348b coupled to the second duplexer 330b, a third PRx low noise amplifier (LNA) 348c coupled to the third duplexer 330c and a fourth PRx low noise amplifier (LNA) 348d coupled to the fourth duplexer 330d. In one configuration, the first PRx low noise amplifier (LNA) 348a and the second PRx low noise amplifier (LNA) 348b may be low band low noise amplifiers (LNAs) while the third PRx low noise amplifier (LNA) 348c and the fourth PRx low noise amplifier (LNA) 348d are midband low noise amplifiers (LNAs).

The primary receiver (PRx) 340 may also include a mixer 356a (e.g., a downconverter). The mixer 356a may be coupled to the output of the first PRx low noise amplifier (LNA) 348a, the output of the second PRx low noise amplifier (LNA) 348b, the output of the third PRx low noise amplifier (LNA) 348c and the output of the fourth PRx low noise amplifier (LNA) 348d.

The primary receiver (PRx) 340 may include a phase locked loop (PLL) 362a, a PRx voltage controlled oscillator (VCO) 360a and a Div stage 358a that are used to generate the downconverting frequency for the mixer 356a. The output of the mixer 356a may be coupled to a PRx baseband filter (BBF) 364a. The PRx baseband filter (BBF) 364a may then output the PRx inphase/quadrature (I/Q) signal 312. The transceiver chip 310 may include a switch 366 that allows the downconverting frequency generated by the PRx voltage controlled oscillator (VCO) 360 to be used by a mixer 356b in the secondary receiver (SRx) 342, a mixer 356c in the tertiary receiver (TRx) 344 and/or a mixer 356d in the quaternary receiver (QRx) 346.

The secondary antenna 308 may be coupled to the second low-pass high-pass diplexer 326b. The second low-pass high-pass diplexer 326b may be coupled to the second switch 328b. The second switch 328b may have two inputs (the signal that includes the bundled low band frequencies and the signal that includes the bundled high band frequencies) and multiple outputs. In one configuration, the second switch 328b may have six possible outputs to the four surface acoustic wave (SAW) filters 334 (representing the six possible configurations of surface acoustic wave (SAW) filter 334 pairs). The four surface acoustic wave (SAW) filters 334 may include a first surface acoustic wave (SAW) filter 334a, a second surface acoustic wave (SAW) filter 334b, a third surface acoustic wave (SAW) filter 334c and a fourth surface acoustic wave (SAW) filter 334d. In one configuration, the first surface acoustic wave (SAW) filter 334a and the second surface acoustic wave (SAW) filter 334b may be used for the low band while the third surface acoustic wave (SAW) filter 334c and the fourth surface acoustic wave (SAW) filter 334d are used for the midband.

The secondary receiver (SRx) 342 may include a first SRx low noise amplifier (LNA) 350a coupled to the first surface acoustic wave (SAW) filter 334a, a second SRx low noise amplifier (LNA) 350b coupled to the second surface acoustic wave (SAW) filter 334b, a third SRx low noise amplifier (LNA) 350c coupled to the third surface acoustic wave (SAW) filter 334c and a fourth SRx low noise amplifier (LNA) 350d coupled to the fourth surface acoustic wave (SAW) filter 334d. In one configuration, the first SRx low noise amplifier (LNA) 350a and the second SRx low noise amplifier (LNA) 350b may be low band low noise amplifiers (LNAs) while the third SRx low noise amplifier (LNA) 350c and the fourth SRx low noise amplifier (LNA) 350d are midband low noise amplifiers (LNAs).

The secondary receiver (SRx) 342 may include a mixer 356b coupled to the output of the first SRx low noise amplifier (LNA) 350a, the output of the second SRx low noise amplifier (LNA) 350b, the output of the third SRx low noise amplifier (LNA) 350c and the output of the fourth SRx low noise amplifier (LNA) 350d. The secondary receiver (SRx) 342 may also include a phase locked loop (PLL) 362b, a SRx voltage controlled oscillator (VCO) 361 and a Div stage 358b that are used to generate a downconverting frequency for the mixer 356b. In one configuration, the switch 366 on the transceiver chip 310 may be set so that the Div stage 358b receives the downconverting frequency generated by the PRx voltage controlled oscillator (VCO) 360 from the primary receiver (PRx) 340. The output of the mixer 356b may be coupled to an SRx baseband filter (BBF) 364b. The SRx baseband filter (BBF) 364b may then output the SRx inphase/quadrature (I/Q) signal 314.

The tertiary receiver (TRx) 344 may include a first TRx low noise amplifier (LNA) 352a, a second TRx low noise amplifier (LNA) 352b, a third TRx low noise amplifier (LNA) 352c and a fourth TRx low noise amplifier (LNA) 352d. In one configuration, the first TRx low noise amplifier (LNA) 352a and the second TRx low noise amplifier (LNA) 352b may be low band low noise amplifiers (LNAs) while the third TRx low noise amplifier (LNA) 352c and the fourth TRx low noise amplifier (LNA) 352d are midband low noise amplifiers (LNAs). The inputs to the first TRx low noise amplifier (LNA) 352a, the second TRx low noise amplifier (LNA) 352b, the third TRx low noise amplifier (LNA) 352c and the fourth TRx low noise amplifier (LNA) 352d may be disabled.

The tertiary receiver (TRx) 344 may include a mixer 356c coupled to the outputs of the first TRx low noise amplifier (LNA) 352a, the second TRx low noise amplifier (LNA) 352b, the third TRx low noise amplifier (LNA) 352c and the fourth TRx low noise amplifier (LNA) 352d. The tertiary receiver (TRx) 344 may also include a Div stage 358c coupled to the mixer 356c. The Div stage 358c may be coupled to the switch 366 on the transceiver chip 310. In one configuration, the switch 366 may be set so that the Div stage 358c may receive the downconverting frequency generated by the PRx voltage controlled oscillator (VCO) 360 from the primary receiver (PRx) 340. In another configuration, the switch 366 may be set so that the Div stage 358c receives the downconverting frequency generated by the SRx voltage controlled oscillator (VCO) 361. The output of the mixer 356c may be coupled to a TRx baseband filter (BBF) 364c. The TRx baseband filter (BBF) 364c may then output the TRx inphase/quadrature (I/Q) signal 316.

The quaternary receiver (QRx) 346 may include a first QRx low noise amplifier (LNA) 354a, a second QRx low noise amplifier (LNA) 354b, a third QRx low noise amplifier (LNA) 354c and a fourth QRx low noise amplifier (LNA) 354d. In one configuration, the first QRx low noise amplifier (LNA) 354a and the second QRx low noise amplifier (LNA) 354b may be low band low noise amplifiers (LNAs) while the third QRx low noise amplifier (LNA) 354c and the fourth QRx low noise amplifier (LNA) 354d are midband low noise amplifiers (LNAs). The inputs to the first QRx low noise amplifier (LNA) 354a, the second QRx low noise amplifier (LNA) 354b, the third QRx low noise amplifier (LNA) 354c and the fourth QRx low noise amplifier (LNA) 354d may be disabled.

The quaternary receiver (QRx) 346 may include a mixer 356d coupled to the outputs of the first QRx low noise amplifier (LNA) 354a, the second QRx low noise amplifier (LNA) 354b, the third QRx low noise amplifier (LNA) 354c and the fourth QRx low noise amplifier (LNA) 354d. The quaternary receiver (QRx) 346 may also include a Div stage 358d coupled to the mixer 356d. The Div stage 358d may be coupled to the switch 366 on the transceiver chip 310. In one configuration, the switch 366 may be set so that the Div stage 358d may receive the downconverting frequency generated by the PRx voltage controlled oscillator (VCO) 360 from the primary receiver (PRx) 340. In another configuration, the switch 366 may be set so that the Div stage 358d receives the downconverting frequency generated by the SRx voltage controlled oscillator (VCO) 361 from the secondary receiver (SRx) 342. The output of the mixer 356d may be coupled to a QRx baseband filter (BBF) 364d. The QRx baseband filter (BBF) 364d may then output the QRx inphase/quadrature (I/Q) signal 318.

Figure 4:
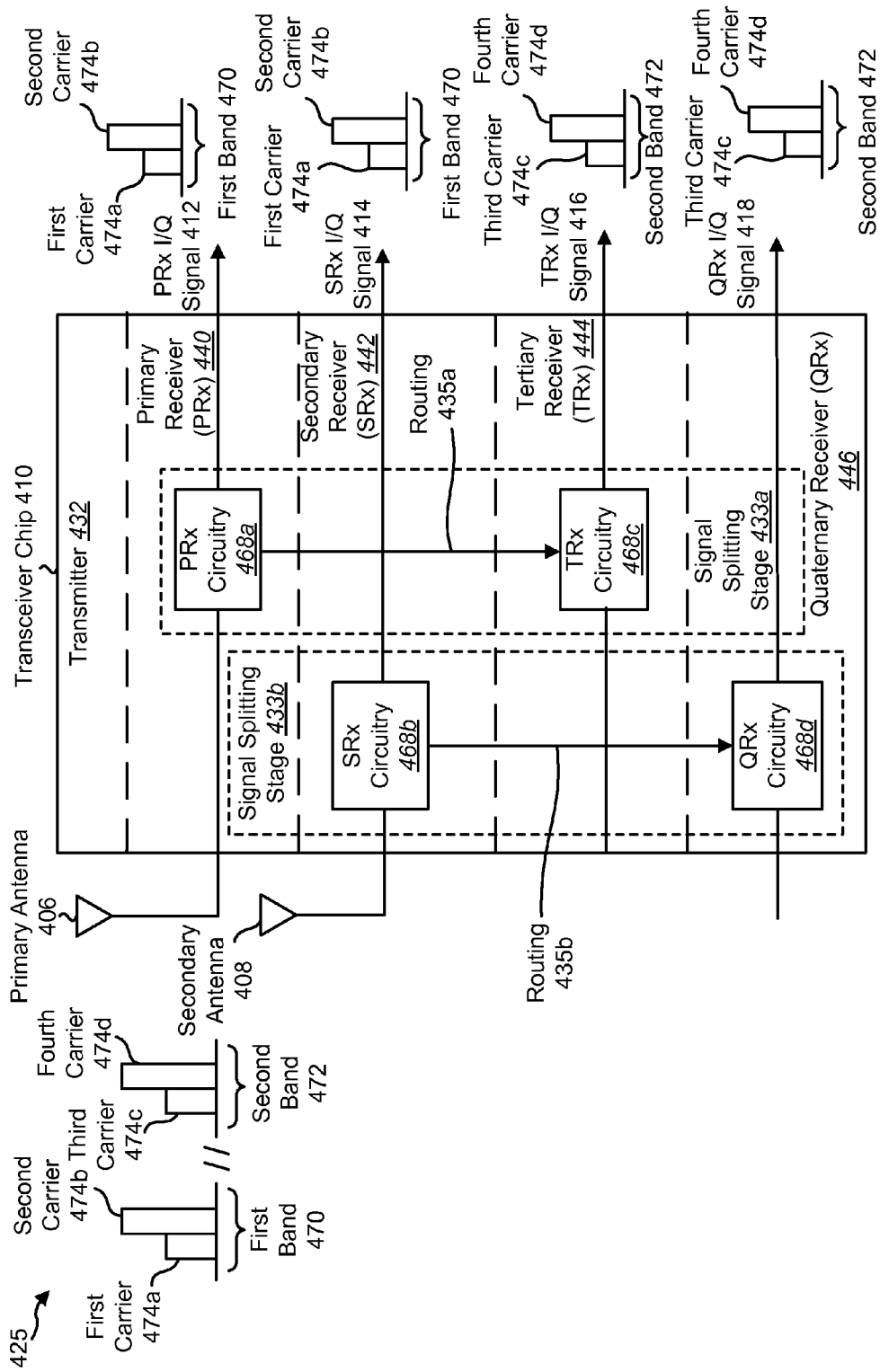
FIG. 4 is a block diagram illustrating a single-chip signal splitting carrier aggregation receiver architecture operating in inter-band mode.

FIG. 4 is a block diagram illustrating a single-chip signal splitting carrier aggregation receiver architecture 425 operating in inter-band mode. The single-chip signal splitting carrier aggregation receiver architecture 425 of FIG. 4 may be one configuration of the single-chip signal splitting carrier aggregation receiver architecture 124 of FIG. 1. The single-chip signal splitting carrier aggregation receiver architecture 425 may include a primary antenna 406, a secondary antenna 408 and a transceiver chip 410. The primary antenna 406 and the secondary antenna 408 may be used to receive a dual-band 4-carrier signal (i.e., four carriers 474a-d over a first band 470 and a second band 472 (the first band 470 and the second band 472 are separated from each other)).

The transceiver chip 410 may include a transmitter 432, a primary receiver (PRx) 440, a secondary receiver (SRx) 442, a tertiary receiver (TRx) 444 and a quaternary receiver (QRx) 446. The primary antenna 406 may be coupled to PRx circuitry 468a of the primary receiver (PRx) 440. The PRx circuitry 468a may include the PRx low noise amplifiers (LNAs) 348a-d, downconverting circuitry and the PRx baseband filter (BBF) 364a. The PRx circuitry 468a may output a PRx inphase/quadrature (I/Q) signal 412 that includes the first carrier 474a and the second carrier 474b in the first band 470.

The transceiver chip 410 may include a routing 435a from the PRx circuitry 468a to TRx circuitry 468c in the tertiary receiver (TRx) 444. In one configuration, the routing 435a may be from a first stage amplifier in a PRx low noise amplifier (LNA) 348 of the PRx circuitry 468a to the TRx circuitry 468c. In another configuration, the routing 435a may be output from a second stage amplifier in a PRx low noise amplifier (LNA) 348 of the PRx circuitry 438a. The TRx circuitry 468c may include the TRx low noise amplifiers (LNAs) 352a-d, the downconverting circuitry and the TRx baseband filter (BBF) 364c. In one configuration, the routing 435 from the PRx circuitry 468a may be input to a second stage amplifier in a TRx low noise amplifier (LNA) 352 of the TRx circuitry 468c. In another configuration, the routing 435a from the PRx circuitry 468a may be input to a mixer 356c of the tertiary receiver (TRx) 444. The TRx circuitry 468c may output a TRx inphase/quadrature (I/Q) signal 416 that includes the third carrier 474c and the fourth carrier 474d in the second band 472.

The secondary antenna 408 may be coupled to SRx circuitry 468b of the secondary receiver (SRx) 442. The SRx circuitry 468b may include the SRx low noise amplifiers (LNAs) 350a-d, the downconverting circuitry and the SRx baseband filter (BBF) 364b. The SRx circuitry 468b may output a SRx inphase/quadrature (I/Q) signal 414 that includes the first carrier 474a and the second carrier 474b in the first band 470.

The transceiver chip 410 may include a routing 435b from the SRx circuitry 468b to QRx circuitry 468d in the quaternary receiver (QRx) 446. In one configuration, the routing 435b may be output from a first stage amplifier in a SRx low noise amplifier (LNA) 350 of the SRx circuitry 468b. In another configuration, the routing 435b may be output from a second stage amplifier in a SRx low noise amplifier (LNA) 350 of the SRx circuitry 468b. The QRx circuitry 468d may include the QRx low noise amplifiers (LNAs) 354a-d, the downconverting circuitry and the QRx baseband filter (BBF) 364d. In one configuration, the routing 435b from the SRx circuitry 468b may be input to a second stage amplifier in a QRx low noise amplifier (LNA) 354 of the QRx circuitry 468d. In another configuration, the routing 435b from the SRx circuitry 468b may be input to a mixer 356d of the quaternary receiver (QRx) 446. The QRx circuitry 468d may output a QRx inphase/quadrature (I/Q) signal 418 that includes the third carrier 474c and the fourth carrier 474d in the second band 472.

The routing 435a from the PRx circuitry 468a to the TRx circuitry 468c may be part of a first signal splitting stage 433a. The routing from the SRx circuitry 468b to the QRx circuitry 468b may be part of a second signal splitting stage 433b. The signal splitting stages 433a-b are discussed in additional detail below in relation to FIG. 8 and FIG. 9.

Figure 5:
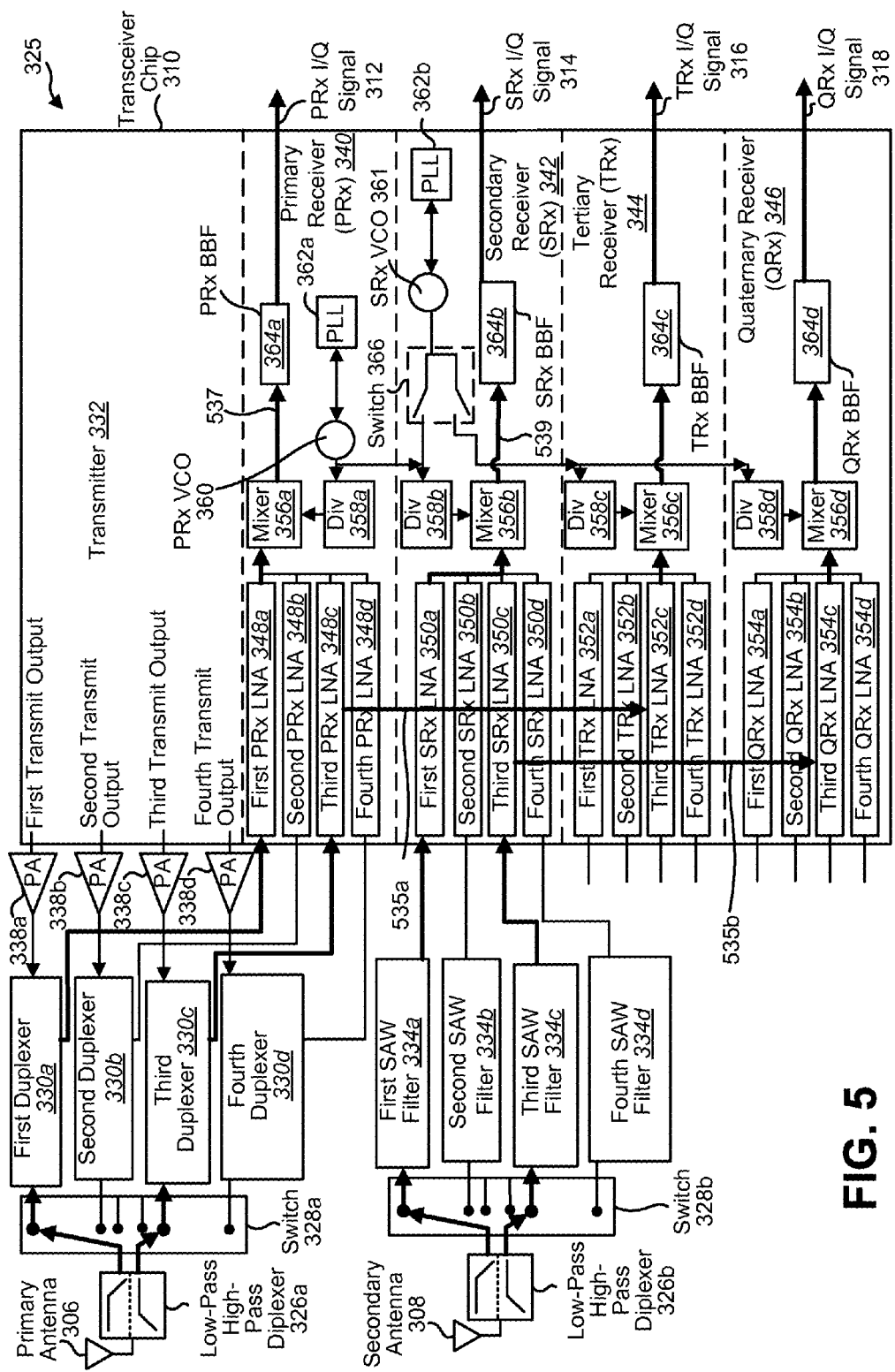
FIG. 5 is another block diagram illustrating a single-chip signal splitting carrier aggregation receiver architecture operating in inter-band mode.

FIG. 5 is another block diagram illustrating a single-chip signal splitting carrier aggregation receiver architecture 325 operating in inter-band mode. The single-chip signal splitting carrier aggregation receiver architecture 325 of FIG. 5 may be the single-chip signal splitting carrier aggregation receiver architecture 325 of FIG. 3. The primary antenna 306 and the secondary antenna 308 may be used to receive a dual-band 4-carrier signal (i.e., four carriers 474a-d over two separate bands). A routing 537 from the primary antenna 306 through the primary receiver (PRx) 340 to obtain the PRx inphase/quadrature (I/Q) signal 314 is shown. The routing 537 may pass through the first PRx low noise amplifier (LNA) 348a. The PRx inphase/quadrature (I/Q) signal 314 may include a first carrier 474a and a second carrier 474b from a first band 470 for this configuration.

A routing 535a from the primary antenna 306 through the tertiary receiver (TRx) 344 to obtain the TRx inphase/quadrature (I/Q) signal 316 is also shown. The TRx inphase/quadrature (I/Q) signal 316 may include a third carrier 474c and a fourth carrier 474d from a second band 472. The routing 535a from the primary antenna 306 through the tertiary receiver (TRx) 344 to obtain the TRx inphase/quadrature (I/Q) signal 316 may pass through a first signal splitting stage 433a. The first signal splitting stage 433a may allow the single-chip signal splitting carrier aggregation receiver architecture 325 to reuse the simultaneous hybrid dual receiver (SHDR) receiver path.

The first signal splitting stage 433a may include the routing 535a from the third PRx low noise amplifier (LNA) 348c in the primary receiver (PRx) 340 to the third TRx low noise amplifier (LNA) 352c in the tertiary receiver (TRx) 344. In one configuration, the routing 535a may be output from a first amplifier stage (e.g., a transconductance stage (Gm)) of the third PRx low noise amplifier (LNA) 348c and input to a second amplifier stage (e.g., a cascode stage (Cas)) of the third TRx low noise amplifier (LNA) 352c. In another configuration, the routing 535a may be output from a second amplifier stage (e.g., a cascode stage (Cas)) of the third PRx low noise amplifier (LNA) 348c and input to the mixer 356c in the tertiary receiver (TRx) 344.

A routing 539 from the secondary antenna 308 through the secondary receiver (SRx) 342 to obtain the SRx inphase/quadrature (I/Q) signal 316 is also shown. The routing 539 may pass through the first SRx low noise amplifier (LNA) 350a. The SRx inphase/quadrature (I/Q) signal 314 may include a first carrier 474a and a second carrier 474b from the first band 470 for this configuration. A routing 535b from the secondary antenna 308 through the quaternary receiver (QRx) 346 to obtain the QRx inphase/quadrature (I/Q) signal 318 is also shown. The QRx inphase/quadrature (I/Q) signal 318 may include a third carrier 474c and a fourth carrier 474d from the second band 472. The routing 535b from the secondary antenna 308 through the quaternary receiver (QRx) 346 to obtain the QRx inphase/quadrature (I/Q) signal 318 may pass through a second signal splitting stage 433b. The second signal splitting stage 433b may also allow the single-chip signal splitting carrier aggregation receiver architecture 325 to reuse the simultaneous hybrid dual receiver (SHDR) receiver path.

The second signal splitting stage 433b may route 535b a signal from the third SRx low noise amplifier (LNA) 350c in the secondary receiver (SRx) 342 to the third QRx low noise amplifier (LNA) 354c in the quaternary receiver (QRx) 346. In one configuration, the routing 535b may be the output of a first amplifier stage (e.g., a transconductance stage (Gm)) of the third SRx low noise amplifier (LNA) 350c to the input of a second amplifier stage (e.g., a cascode stage (Cas)) of the third QRx low noise amplifier (LNA) 354c. In another configuration, the routing 535b may be the output of a second amplifier stage (e.g., a cascode stage (Cas)) of the third SRx low noise amplifier (LNA) 350c to the input of the mixer 356d in the quaternary receiver (QRx) 346.

Figure 6:
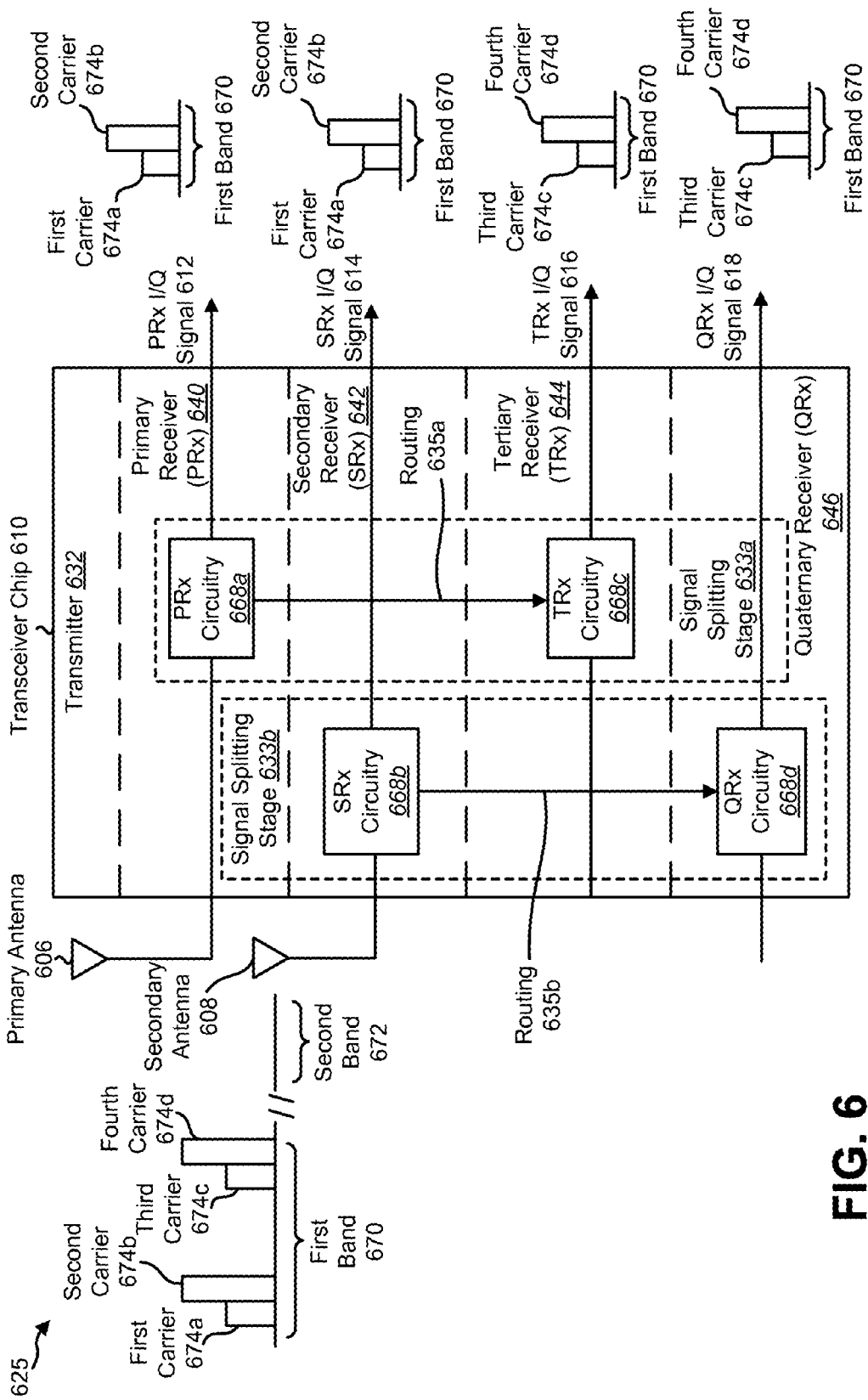
FIG. 6 is a block diagram illustrating a single-chip signal splitting carrier aggregation receiver architecture operating in intra-band mode.

FIG. 6 is a block diagram illustrating a single-chip signal splitting carrier aggregation receiver architecture 625 operating in intra-band mode. The single-chip signal splitting carrier aggregation receiver architecture 625 of FIG. 6 may be one configuration of the single-chip signal splitting carrier aggregation receiver architecture 124 of FIG. 1. The single-chip signal splitting carrier aggregation receiver architecture 625 may include a primary antenna 606, a secondary antenna 608 and a transceiver chip 610. The primary antenna 606 and the secondary antenna 608 may be used to receive a single-band 4-carrier signal (i.e., four carriers 674a-d over a first band 670).

The transceiver chip 610 may include a transmitter 632, a primary receiver (PRx) 640, a secondary receiver (SRx) 642, a tertiary receiver (TRx) 644 and a quaternary receiver (QRx) 646. The primary antenna 606 may be coupled to PRx circuitry 668a of the primary receiver (PRx) 640. The PRx circuitry 668a may include the PRx low noise amplifiers (LNAs) 348a-d, downconverting circuitry and the PRx baseband filter (BBF) 364a. The PRx circuitry 668a may output a PRx inphase/quadrature (I/Q) signal 612 that includes the first carrier 674a and the second carrier 674b in the first band 670.

The transceiver chip 610 may include a routing 635a from the PRx circuitry 668a to TRx circuitry 668c in the tertiary receiver (TRx) 644. In one configuration, the routing 635a may be from a first stage amplifier in a PRx low noise amplifier (LNA) 348 of the PRx circuitry 668a to the TRx circuitry 668c. In another configuration, the routing 635a may be output from a second stage amplifier in a PRx low noise amplifier (LNA) 348 of the PRx circuitry 668a. The TRx circuitry 668c may include the TRx low noise amplifiers (LNAs) 352a-d, the downconverting circuitry and the TRx baseband filter (BBF) 364c. In one configuration, the routing 635 from the PRx circuitry 668a may be input to a second stage amplifier in a TRx low noise amplifier (LNA) 352 of the TRx circuitry 668c. In another configuration, the routing 635a from the PRx circuitry 668a may be input to a mixer 356c of the tertiary receiver (TRx) 644. The TRx circuitry 668c may output a TRx inphase/quadrature (I/Q) signal 616 that includes the third carrier 674c and the fourth carrier 674d in the first band 670.

The secondary antenna 608 may be coupled to SRx circuitry 668b of the secondary receiver (SRx) 642. The SRx circuitry 668b may include the SRx low noise amplifiers (LNAs) 350a-d, the downconverting circuitry and the SRx baseband filter (BBF) 364b. The SRx circuitry 668b may output a SRx inphase/quadrature (I/Q) signal 614 that includes the first carrier 674a and the second carrier 674b in the first band 670.

The transceiver chip 610 may include a routing 635b from the SRx circuitry 668b to QRx circuitry 668d in the quaternary receiver (QRx) 646. In one configuration, the routing 635b may be output from a first stage amplifier in a SRx low noise amplifier (LNA) 350 of the SRx circuitry 668b. In another configuration, the routing 635b may be output from a second stage amplifier in a SRx low noise amplifier (LNA) 350 of the SRx circuitry 668b. The QRx circuitry 668d may include the QRx low noise amplifiers (LNAs) 354a-d, the downconverting circuitry and the QRx baseband filter (BBF) 364d. In one configuration, the routing 635b from the SRx circuitry 668b may be input to a second stage amplifier in a QRx low noise amplifier (LNA) 354 of the QRx circuitry 668d. In another configuration, the routing 635b from the SRx circuitry 668b may be input to a mixer 356d of the quaternary receiver (QRx) 646. The QRx circuitry 668d may output a QRx inphase/quadrature (I/Q) signal 618 that includes the third carrier 674c and the fourth carrier 674d in the first band 670.

The routing 635a from the PRx circuitry 668a to the TRx circuitry 668c may be part of a first signal splitting stage 633a. The routing from the SRx circuitry 668b to the QRx circuitry 668b may be part of a second signal splitting stage 633b. The signal splitting stages 633a-b are discussed in additional detail below in relation to FIG. 8 and FIG. 9.

Figure 7:
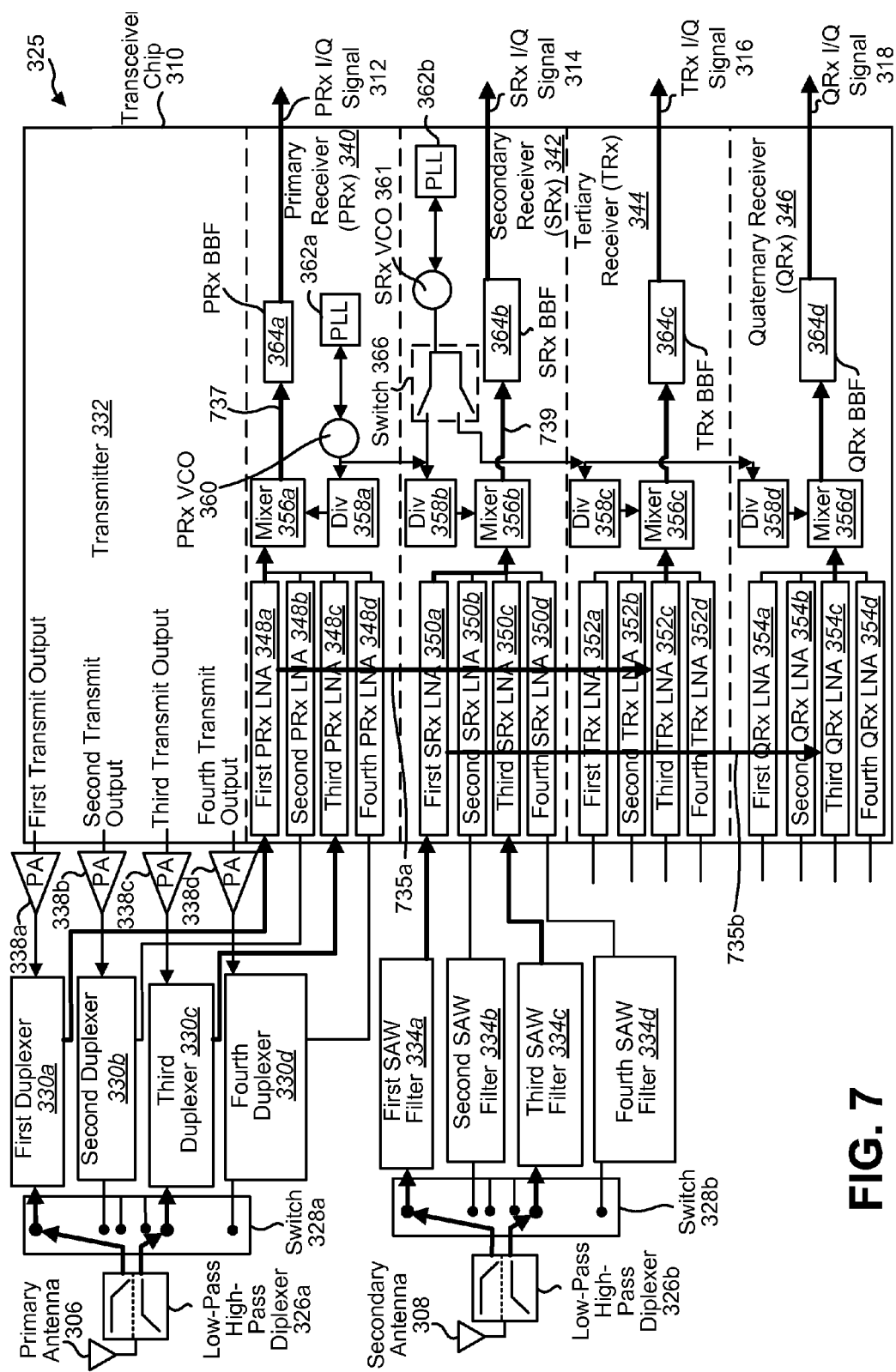
FIG. 7 is another block diagram illustrating a single-chip signal splitting carrier aggregation receiver architecture operating in intra-band mode.

FIG. 7 is another block diagram illustrating a single-chip signal splitting carrier aggregation receiver architecture 325 operating in intra-band mode. The single-chip signal splitting carrier aggregation receiver architecture 325 of FIG. 7 may be the single-chip signal splitting carrier aggregation receiver architecture 325 of FIG. 3. Intra-band mode may require current splitting. A 6 decibel (dB) loss may lead to 0.2-0.5 db noise factor (NF) degradation. The low noise amplifiers (LNA) in the radio frequency integrated circuit (RFIC) may need to be designed as mixer Gm.

The primary antenna 306 and the secondary antenna 308 may be used to receive a single-band 4-carrier signal (i.e., four carriers 674a-d over a first band 670 and no carriers in a second band 672). A routing 737 from the primary antenna 306 through the primary receiver (PRx) 340 to obtain the PRx inphase/quadrature (I/Q) signal 314 is shown. The routing 737 may pass through the first PRx low noise amplifier (LNA) 348a. The PRx inphase/quadrature (I/Q) signal 314 may include a first carrier 674a and a second carrier 674b from a first band 670 for this configuration.

A routing 735a from the primary antenna 306 through the tertiary receiver (TRx) 344 to obtain the TRx inphase/quadrature (I/Q) signal 316 is also shown. The TRx inphase/quadrature (I/Q) signal 316 may include a third carrier 674c and a fourth carrier 674d from the first band 670. The routing 735a from the primary antenna 306 through the tertiary receiver (TRx) 344 to obtain the TRx inphase/quadrature (I/Q) signal 316 may pass through a first signal splitting stage 633a. The first signal splitting stage 633a may allow the single-chip signal splitting carrier aggregation receiver architecture 325 to reuse the simultaneous hybrid dual receiver (SHDR) receiver path.

The first signal splitting stage 633a may include a routing 735a from the first PRx low noise amplifier (LNA) 348a in the primary receiver (PRx) 340 to the third TRx low noise amplifier (LNA) 352c in the tertiary receiver (TRx) 344. In one configuration, the routing 735a may be output from a first amplifier stage (e.g., a transconductance stage (Gm)) of the first PRx low noise amplifier (LNA) 348a and input to a second amplifier stage (e.g., a cascode stage (Cas)) of the third TRx low noise amplifier (LNA) 352c. In another configuration, the routing 735a may be output from a second amplifier stage (e.g., a cascode stage (Cas)) of the first PRx low noise amplifier (LNA) 348c and input to the mixer 356c in the tertiary receiver (TRx) 344.

A routing 739 from the secondary antenna 308 through the secondary receiver (SRx) 342 to obtain the SRx inphase/quadrature (I/Q) signal 316 is also shown. The routing 739 may pass through the first SRx low noise amplifier (LNA) 350a. The SRx inphase/quadrature (I/Q) signal 314 may include a first carrier 674a and a second carrier 674b from the first band 670 for this configuration. A routing 735b from the secondary antenna 308 through the quaternary receiver (QRx) 346 to obtain the QRx inphase/quadrature (I/Q) signal 318 is also shown. The QRx inphase/quadrature (I/Q) signal 318 may include a third carrier 674c and a fourth carrier 674d from the first band 670. The routing 735b from the secondary antenna 308 through the quaternary receiver (QRx) 346 to obtain the QRx inphase/quadrature (I/Q) signal 318 may pass through a second signal splitting stage 633b. The second signal splitting stage 633b may also allow the single-chip signal splitting carrier aggregation receiver architecture 325 to reuse the simultaneous hybrid dual receiver (SHDR) receiver path.

The second signal splitting stage 633b may route 735b a signal from the first SRx low noise amplifier (LNA) 350a in the secondary receiver (SRx) 342 to the third QRx low noise amplifier (LNA) 354c in the quaternary receiver (QRx) 346. In one configuration, the routing 735b may be the output of a first amplifier stage (e.g., a transconductance stage (Gm)) of the first SRx low noise amplifier (LNA) 350a to the input of a second amplifier stage (e.g., a cascode stage (Cas)) of the third QRx low noise amplifier (LNA) 354c. In another configuration, the routing 735b may be the output of a second amplifier stage (e.g., a cascode stage (Cas)) of the first SRx low noise amplifier (LNA) 350a to the input of the mixer 356d in the quaternary receiver (QRx) 346.

Figure 8:
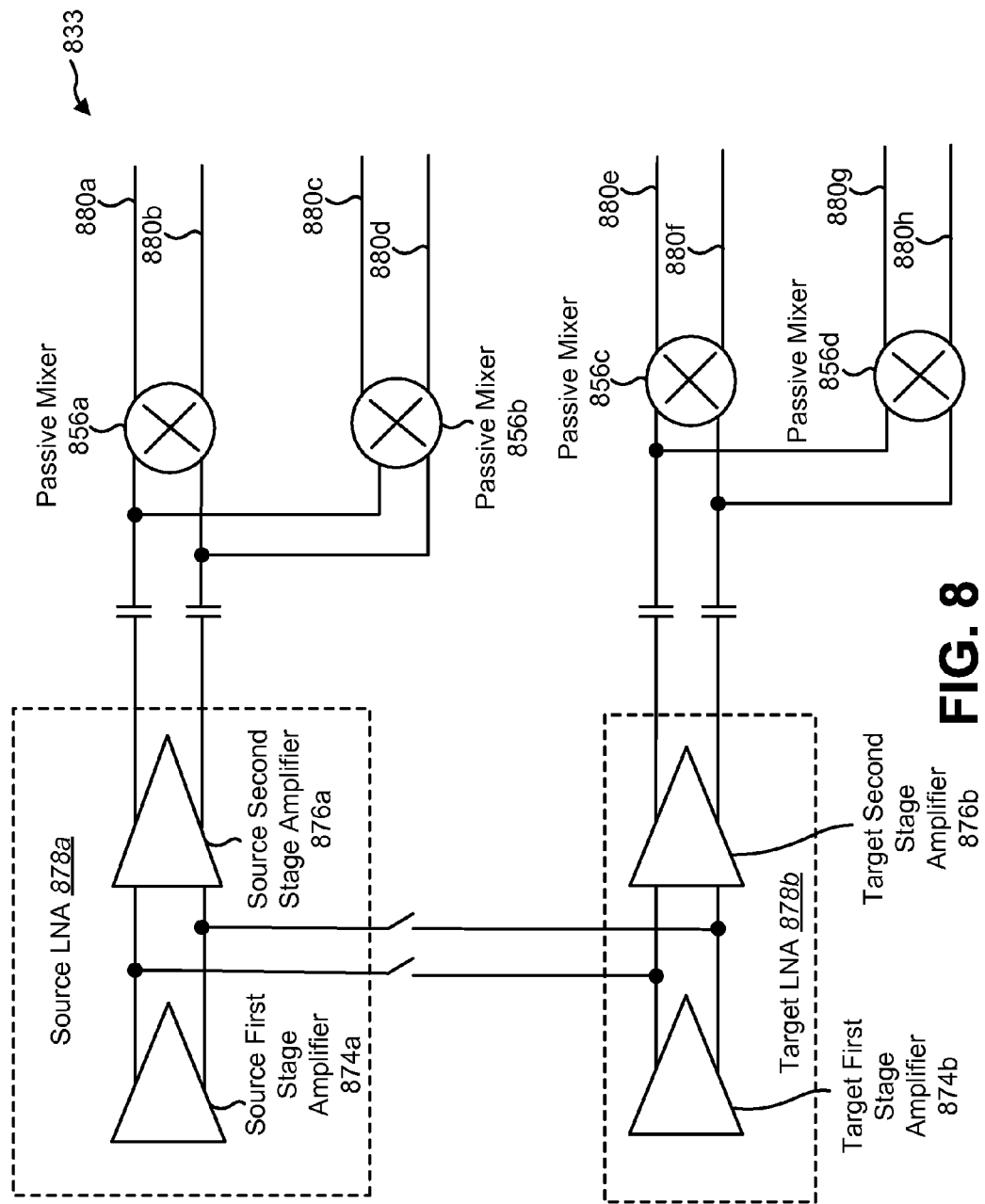
FIG. 8 is a block diagram illustrating a signal splitting stage.

FIG. 8 is a block diagram illustrating a signal splitting stage 833. The signal splitting stage 833 of FIG. 8 may be one configuration of the signal splitting stages 433a-b in FIG. 4 and the signal splitting stages 633a-b in FIG. 6. The signal splitting stage 833 may include a source first stage amplifier 874a and a source second stage amplifier 876a as part of a source low noise amplifier (LNA) 878a, a target first stage amplifier 874b and a target second stage amplifier 876b of a target low noise amplifier (LNA) 878b and passive mixers 856a-d. In one configuration, the source low noise amplifier (LNA) 878a may be a PRx low noise amplifier (LNA) 348 and the target low noise amplifier (LNA) may be a TRx low noise amplifier 352. In another configuration, the source low noise amplifier (LNA) 878a may be an SRx low noise amplifier (LNA) 350 and the target low noise amplifier (LNA) 878b may be a QRx low noise amplifier (LNA) 354.

In one configuration, the source first stage amplifier 874a and the target first stage amplifier 874b may be transconductance stages (Gm) while the source second stage amplifier 876a and the target second stage amplifier 876b may be cascode stages (Cas). The outputs of the source first stage amplifier 874a may be input to the source second stage amplifier 876a. The outputs of the source second stage amplifier 876a may then be mixed via the passive mixers 856a-b to obtain the source inphase signals 880a-b and the source quadrature signals 880c-d. In the signal splitting stage 833, the signal splitting occurs after the source first stage amplifier 874a. Thus, the outputs of the source first stage amplifier 874a may be input to the inputs of the target second stage amplifier 876b. The outputs of the target second stage amplifier 876b may then be mixed via the passive mixers 856c-d to obtain the target inphase signals 880e-f and the target quadrature signals 880g-h.

Switches may be used between the source low noise amplifier (LNA) 878a and the target low noise amplifier (LNA) 878b to allow a clean standalone operation. The low noise amplifier (LNA) topology may drive the signal splitting sensing point.

Figure 9:
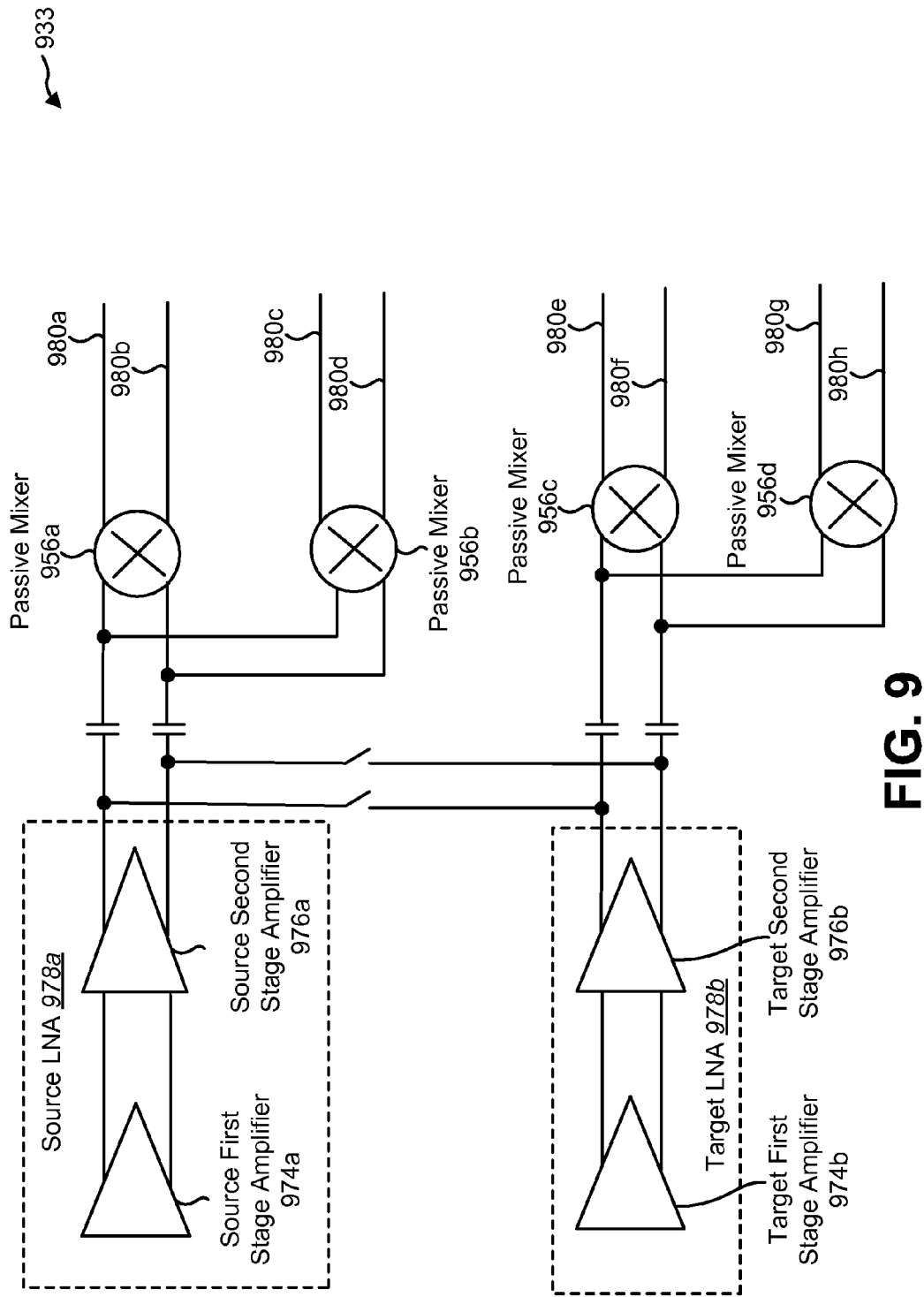
FIG. 9 is a block diagram illustrating another signal splitting stage.

FIG. 9 is a block diagram illustrating another signal splitting stage 933. The signal splitting stage 933 of FIG. 9 may be one configuration of the signal splitting stages 433a-b in FIG. 4 and the signal splitting stages 633a-b in FIG. 6. The signal splitting stage 933 may include a source first stage amplifier 974a and a source second stage amplifier 976a as part of a source low noise amplifier (LNA) 978a, a target first stage amplifier 974b and a target second stage amplifier 976b of a target low noise amplifier (LNA) 978b and passive mixers 956a-d. In one configuration, the source low noise amplifier (LNA) 978a may be a PRx low noise amplifier (LNA) 348 and the target low noise amplifier (LNA) may be a TRx low noise amplifier 352. In another configuration, the source low noise amplifier (LNA) 978a may be an SRx low noise amplifier (LNA) 350 and the target low noise amplifier (LNA) 978b may be a QRx low noise amplifier (LNA) 354.

In one configuration, the source first stage amplifier 974a and the target first stage amplifier 974b may be transconductance stages (Gm) while the source second stage amplifier 976a and the target second stage amplifier 976b may be cascode stages (Cas). The outputs of the source first stage amplifier 974a may be input to the source second stage amplifier 976a. The outputs of the source second stage amplifier 976a may then be mixed via the passive mixers 956a-b to obtain the source inphase signals 980a-b and the source quadrature signals 980c-d. In the signal splitting stage 933, the signal splitting occurs after the source second stage amplifier 976a. Thus, the outputs of the source second stage amplifier 976a may be input to the passive mixers 856c-d to obtain the target inphase signals 980e-f and the target quadrature signals 980g-h.

Switches may be used between the source low noise amplifier (LNA) 978a and the target low noise amplifier (LNA) 978b to allow a clean standalone operation. The low noise amplifier (LNA) topology may drive the signal splitting sensing point.

Figure 10:
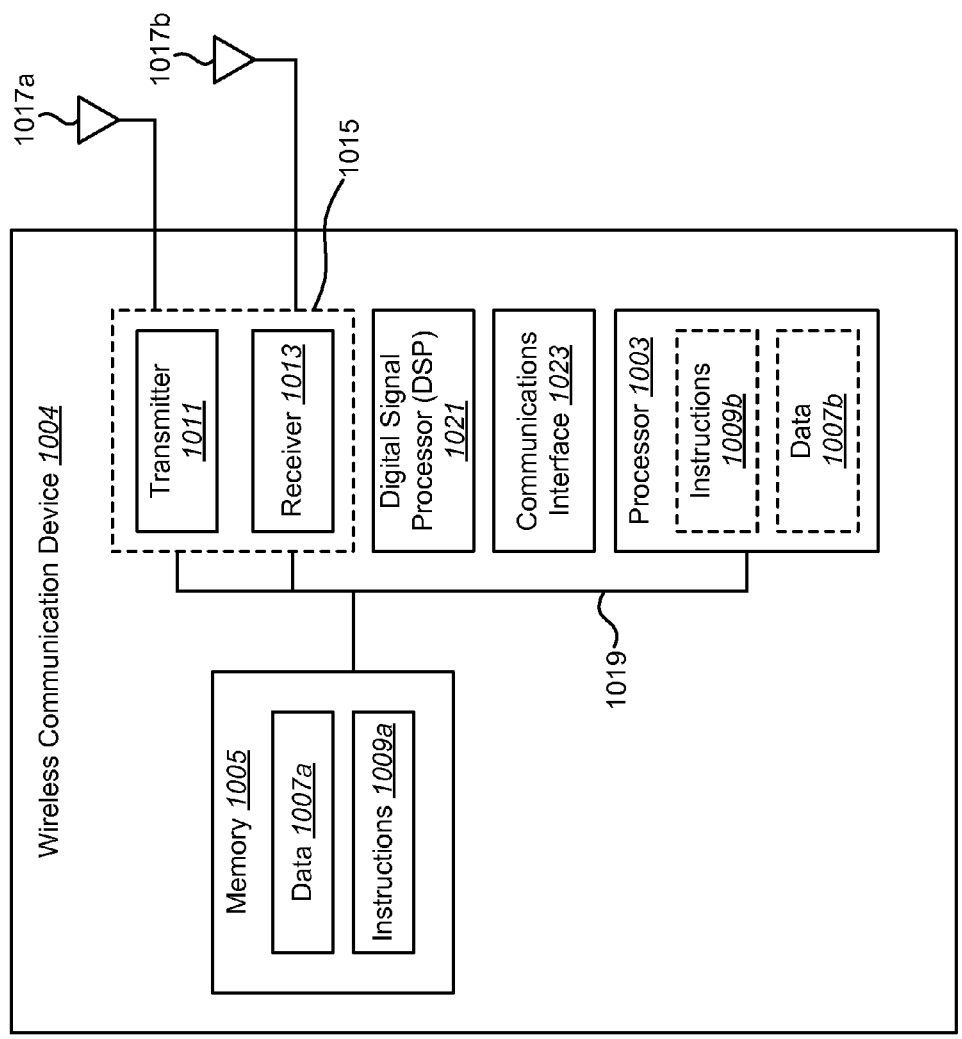
FIG. 10 illustrates certain components that may be included within a wireless communication device.

FIG. 10 illustrates certain components that may be included within a wireless communication device 1004. The wireless communication device 1004 may be an access terminal, a mobile station, a user equipment (UE), etc. The wireless communication device 1004 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless communication device 1004 of FIG. 10, in an alternative configuration, a combination of processors (e.g., an ARM and DSP) could be used.

The wireless communication device 1004 also includes memory 1005. The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1007a and instructions 1009a may be stored in the memory 1005. The instructions 1009a may be executable by the processor 1003 to implement the methods disclosed herein. Executing the instructions 1009a may involve the use of the data 1007a that is stored in the memory 1005. When the processor 1003 executes the instructions 1009, various portions of the instructions 1009b may be loaded onto the processor 1003, and various pieces of data 1007b may be loaded onto the processor 1003.

The wireless communication device 1004 may also include a transmitter 1011 and a receiver 1013 to allow transmission and reception of signals to and from the wireless communication device 1004 via a first antenna 1017a and a second antenna 1017b. The transmitter 1011 and receiver 1013 may be collectively referred to as a transceiver 1015. The wireless communication device 1004 may also include (not shown) multiple transmitters, additional antennas, multiple receivers and/or multiple transceivers.

The wireless communication device 1004 may include a digital signal processor (DSP) 1021. The wireless communication device 1004 may also include a communications interface 1023. The communications interface 1023 may allow a user to interact with the wireless communication device 1004.

The various components of the wireless communication device 1004 may be coupled together by one or more buses, which may include a power bus, a control signal bus, a status signal bus, a data bus, etc. For the sake of clarity, the various buses are illustrated in FIG. 15 as a bus system 1019.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A wireless communication device configured for receiving a multiple carrier signal, comprising:
   a single-chip signal splitting carrier aggregation receiver architecture that comprises:

a primary antenna;
a secondary antenna; and
a transceiver chip, wherein the single-chip signal splitting carrier aggregation receiver architecture reuses a simultaneous hybrid dual receiver path, the simultaneous hybrid dual receiver path comprising a first routing from the primary antenna through a primary receiver to a tertiary receiver and a second routing from the secondary antenna through a secondary receiver to a quaternary receiver,
wherein the first routing comprises a third routing between a first stage amplifier of a source low noise amplifier of the primary receiver and a second stage amplifier of a target low noise amplifier of the tertiary receiver, and
wherein the second routing comprises a fourth routing between a first stage amplifier of a source low noise amplifier of the secondary receiver and a second stage amplifier of a target low noise amplifier of the quaternary receiver.

2. The wireless communication device of claim 1, wherein the single-chip signal splitting carrier aggregation receiver architecture does not require four antennas, a power splitter, an external low noise amplifier, or die-to-die signal routing.

3. The wireless communication device of claim 1, wherein the transceiver chip comprises:
a transmitter;
the primary receiver;
the secondary receiver;
the tertiary receiver; and
the quaternary receiver,
wherein each receiver comprises multiple low noise amplifiers, and
wherein each low noise amplifier comprises a first stage amplifier and a second stage amplifier.

4. The wireless communication device of claim 3, wherein the first stage amplifier is a transconductance stage, and wherein the second stage amplifier is a cascode stage.

5. The wireless communication device of claim 3, wherein the multiple low noise amplifiers comprise multiple low noise amplifiers for a first band and multiple low noise amplifiers for a second band.

6. The wireless communication device of claim 5, wherein the first band is a low band and the second band is a mid band.

7. The wireless communication device of claim 5, wherein the first band is a low band and the second band is a high band.

8. The wireless communication device of claim 5, wherein the first band is a mid band and the second band is a high band.

9. The wireless communication device of claim 3, wherein a fifth routing is used from the primary antenna through the primary receiver to obtain a primary inphase/quadrature signal, wherein a sixth routing is used from the primary antenna through the tertiary receiver to obtain a TRx inphase/quadrature signal, wherein a seventh routing is used from the secondary antenna through the secondary receiver to obtain a secondary inphase/quadrature signal, and wherein an eighth routing is used from the secondary antenna through the quaternary receiver to obtain a QRx inphase/quadrature signal.

10. The wireless communication device of claim 9, wherein the single-chip signal splitting carrier aggregation receiver architecture is in inter-band operation, wherein the fifth routing passes through a first primary receiver low noise amplifier, wherein the sixth routing passes through a second primary receiver low noise amplifier, wherein the sixth routing passes through a first signal splitting stage, wherein the seventh routing passes through a first secondary receiver low noise amplifier, wherein the eighth routing passes through a second secondary receiver low noise amplifier, and wherein the eighth routing passes through a second signal splitting stage.

11. The wireless communication device of claim 9, wherein the single-chip signal splitting carrier aggregation receiver architecture is in intra-band operation, wherein the fifth routing and the sixth routing pass through a primary receiver low noise amplifier, wherein the sixth routing passes through a first signal splitting stage, wherein the seventh routing and the eighth routing pass through a secondary receiver low noise amplifier, and wherein the eighth routing passes through a second signal splitting stage.

12. A method for receiving a multiple carrier signal using a single-chip signal splitting carrier aggregation receiver architecture, comprising:
receiving a first signal using a primary antenna;
routing the first signal through a primary receiver on a transceiver chip in the single-chip signal splitting carrier aggregation receiver architecture to obtain a primary inphase/quadrature signal;
routing the first signal from a first stage amplifier of a source low noise amplifier of the primary receiver through a second stage amplifier of a target low noise amplifier of a tertiary receiver on the transceiver chip to obtain a TRx inphase/quadrature signal;
receiving a second signal using a secondary antenna;
routing the second signal through a secondary receiver on the transceiver chip to obtain a secondary inphase/quadrature signal; and
routing the second signal from a first stage amplifier of a source low noise amplifier of the secondary receiver through a second stage amplifier a target low noise amplifier of a quaternary receiver on the transceiver chip to obtain a QRx inphase/quadrature signal.

13. The method of claim 12, wherein the single-chip signal splitting carrier aggregation receiver architecture does not require four antennas, a power splitter, an external low noise amplifier, or die-to-die signal routing.

14. The method of claim 12, wherein the transceiver chip comprises:
a transmitter;
the primary receiver;
the secondary receiver;
the tertiary receiver; and
the quaternary receiver,
wherein each receiver comprises multiple low noise amplifiers, and
wherein each low noise amplifier comprises a first stage amplifier and a second stage amplifier.

15. The method of claim 14, wherein the first stage amplifier is a transconductance stage, and wherein the second stage amplifier is a cascode stage.

16. The method of claim 14, wherein the multiple low noise amplifiers comprise multiple low noise amplifiers for a first band and multiple low noise amplifiers for a second band.

17. The method of claim 16, wherein the first band is a low band and the second band is a mid band.

18. The method of claim 16, wherein the first band is a low band and the second band is a high band.

19. The method of claim 16, wherein the first band is a mid band and the second band is a high band.

20. The method of claim 14, wherein a first routing is used from the primary antenna through the primary receiver to obtain the primary inphase/quadrature signal, wherein a second routing is used from the primary antenna through the tertiary receiver to obtain the TRx inphase/quadrature signal, wherein a third routing is used from the secondary antenna through the secondary receiver to obtain the secondary inphase/quadrature signal, and wherein a fourth routing is used from the secondary antenna through the quaternary receiver to obtain the QRx inphase/quadrature signal.

21. The method of claim 20, wherein the single-chip signal splitting carrier aggregation receiver architecture is in interband operation, wherein the first routing passes through a first primary receiver low noise amplifier, wherein the second routing passes through a second primary receiver low noise amplifier, wherein the second routing passes through a first signal splitting stage, wherein the third routing passes through a first secondary receiver low noise amplifier, wherein the fourth routing passes through a second secondary receiver low noise amplifier, and wherein the fourth routing passes through a second signal splitting stage.

22. The method of claim 20, wherein the single-chip signal splitting carrier aggregation receiver architecture is in intraband operation, wherein the first routing and the second routing pass through a primary receiver low noise amplifier, wherein the second routing passes through a first signal splitting stage, wherein the third routing and the fourth routing pass through a secondary receiver low noise amplifier, and wherein the fourth routing passes through a second signal splitting stage.

23. An apparatus for receiving a multiple carrier signal using a single-chip signal splitting carrier aggregation receiver architecture, comprising:
   means for receiving a first signal;
   means for routing the first signal through a primary receiver on a transceiver chip in the single-chip signal splitting carrier aggregation receiver architecture to obtain a primary inphase/quadrature signal;
   means for routing the first signal from a first stage amplifier of a source low noise amplifier of the primary receiver through a second stage amplifier of a target low noise amplifier of a tertiary receiver on the transceiver chip to obtain a TRx inphase/quadrature signal;
   means for receiving a second signal;
   means for routing the second signal through a secondary receiver on the transceiver chip to obtain a secondary inphase/quadrature signal; and
   means for routing the second signal from a first stage amplifier of a source low noise amplifier of the secondary receiver through a second stage amplifier a target low noise amplifier of a quaternary receiver on the transceiver chip to obtain a QRx inphase/quadrature signal.

24. The apparatus of claim 23, wherein the single-chip signal splitting carrier aggregation receiver architecture does not require four antennas, a power splitter, an external low noise amplifier, or die-to-die signal routing.

25. The apparatus of claim 23, wherein the transceiver chip comprises:
   a transmitter;
   the primary receiver;
   the secondary receiver;
   the tertiary receiver; and
   the quaternary receiver,
   wherein each receiver comprises multiple low noise amplifiers, and
   wherein each low noise amplifier comprises a first stage amplifier and a second stage amplifier.

26. The apparatus of claim 25, wherein the first stage amplifier is a transconductance stage, and wherein the second stage amplifier is a cascode stage.

27. The apparatus of claim 25, wherein the multiple low noise amplifiers comprise multiple low noise amplifiers for a first band and multiple low noise amplifiers for a second band.

28. A wireless communication device configured for receiving a multiple carrier signal, comprising:
   a single-chip signal splitting carrier aggregation receiver architecture that comprises:
   a primary antenna;
   a secondary antenna; and
   a transceiver chip, wherein the single-chip signal splitting carrier aggregation receiver architecture reuses a simultaneous hybrid dual receiver path, the simultaneous hybrid dual receiver path comprising a first routing from the primary antenna through a primary receiver to a tertiary receiver and a second routing from the secondary antenna through a secondary receiver to a quaternary receiver,
   wherein the first routing comprises a third routing between a second stage amplifier of a source low noise amplifier of the primary receiver and a mixer of the tertiary receiver, and
   wherein the second routing comprises a fourth routing between a second stage amplifier of a source low noise amplifier of the secondary receiver and a mixer of the quaternary receiver.

29. A method for receiving a multiple carrier signal using a single-chip signal splitting carrier aggregation receiver architecture, comprising:
   receiving a first signal using a primary antenna;
   routing the first signal through a primary receiver on a transceiver chip in the single-chip signal splitting carrier aggregation receiver architecture to obtain a primary inphase/quadrature signal;
   routing the first signal from a second stage amplifier of a source low noise amplifier of the primary receiver through a mixer of a tertiary receiver on the transceiver chip to obtain a TRx inphase/quadrature signal;
   receiving a second signal using a secondary antenna;
   routing the second signal through a secondary receiver on the transceiver chip to obtain a secondary inphase/quadrature signal; and
   routing the second signal from a second stage amplifier of a source low noise amplifier of the secondary receiver through a mixer of a quaternary receiver on the transceiver chip to obtain a QRx inphase/quadrature signal.

30. An apparatus for receiving a multiple carrier signal using a single-chip signal splitting carrier aggregation receiver architecture, comprising:
   means for receiving a first signal;
   means for routing the first signal through a primary receiver on a transceiver chip in the single-chip signal splitting carrier aggregation receiver architecture to obtain a primary inphase/quadrature signal;
   means for routing the first signal from a first stage amplifier of a source low noise amplifier of the primary receiver through a mixer of a tertiary receiver on the transceiver chip to obtain a TRx inphase/quadrature signal;
   means for receiving a second signal;
   means for routing the second signal through a secondary receiver on the transceiver chip to obtain a secondary inphase/quadrature signal; and
   means for routing the second signal from a first stage amplifier of a source low noise amplifier of the secondary receiver through a mixer of a quaternary receiver on the transceiver chip to obtain a QRx inphase/quadrature signal.

* * * * *